(12) United States Patent
Hamaguchi

(10) Patent No.: US 8,649,041 B2
(45) Date of Patent: Feb. 11, 2014

(54) REMOTE CONTROL SYSTEM, IMAGE PROCESSING APPARATUS, CONTROL METHOD THEREFOR, AND RECORDING MEDIUM STORING PROGRAM THEREFOR

(75) Inventor: Jun Hamaguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 864 days.

(21) Appl. No.: 12/405,727

(22) Filed: Mar. 17, 2009

(65) Prior Publication Data

US 2009/0237725 A1 Sep. 24, 2009

(30) Foreign Application Priority Data

Mar. 18, 2008 (JP) .................... 2008-069967

(51) Int. Cl.
*G06F 3/12* (2006.01)
*G06K 15/00* (2006.01)

(52) U.S. Cl.
USPC ......... 358/1.15; 358/1.13; 358/1.14; 717/167

(58) Field of Classification Search
USPC ..................................... 358/1.15
See application file for complete search history.

(56) References Cited

U.S. PATENT DOCUMENTS

| 6,041,183 | A * | 3/2000 | Hayafune et al. ............. 717/173 |
| 6,577,822 | B2 * | 6/2003 | Inui et al. ....................... 399/11 |
| 2005/0141020 | A1 * | 6/2005 | Harano ......................... 358/1.15 |
| 2005/0271400 | A1 * | 12/2005 | Okamoto et al. ............... 399/21 |
| 2006/0212554 | A1 * | 9/2006 | Shouno ......................... 709/221 |
| 2006/0290969 | A1 * | 12/2006 | Tomidokoro et al. ........ 358/1.14 |
| 2008/0079659 | A1 * | 4/2008 | Kunita et al. ..................... 345/4 |

FOREIGN PATENT DOCUMENTS

| JP | 5-122424 A | 5/1993 |
| JP | 2001-265549 A | 9/2001 |
| JP | 2005-309982 A | 11/2005 |
| JP | 2006-042264 A | 2/2006 |
| JP | 2007-074661 A | 3/2007 |
| JP | 2007-087026 A | 4/2007 |

* cited by examiner

*Primary Examiner* — Huo Long Chen
(74) *Attorney, Agent, or Firm* — Canon U.S.A., Inc., IP Division

(57) ABSTRACT

An image processing apparatus capable of being remotely controlled by an information processing apparatus via a network includes a request transmission unit configured to transmit a remote control request to the information processing apparatus via the network, a detection unit configured to receive changing information for changing a setting value for the image processing apparatus from the information processing apparatus via the network and detect a content of the change of the setting value based on the changing information, and a display unit configured to display a message for prompting an operator of the image processing apparatus to determine whether to permit changing of the setting value according to the content of the change of the setting value detected by the detection unit.

12 Claims, 15 Drawing Sheets

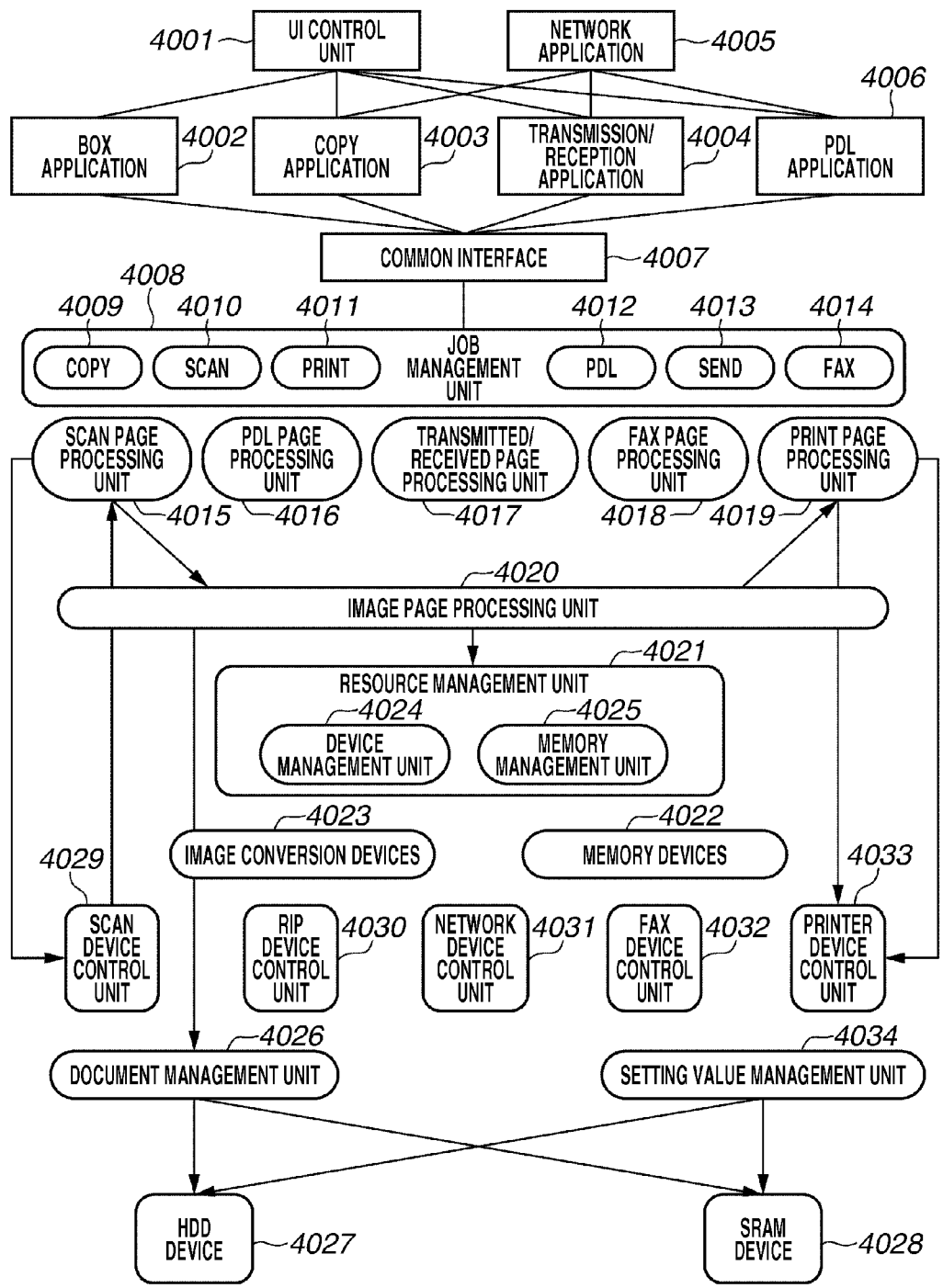

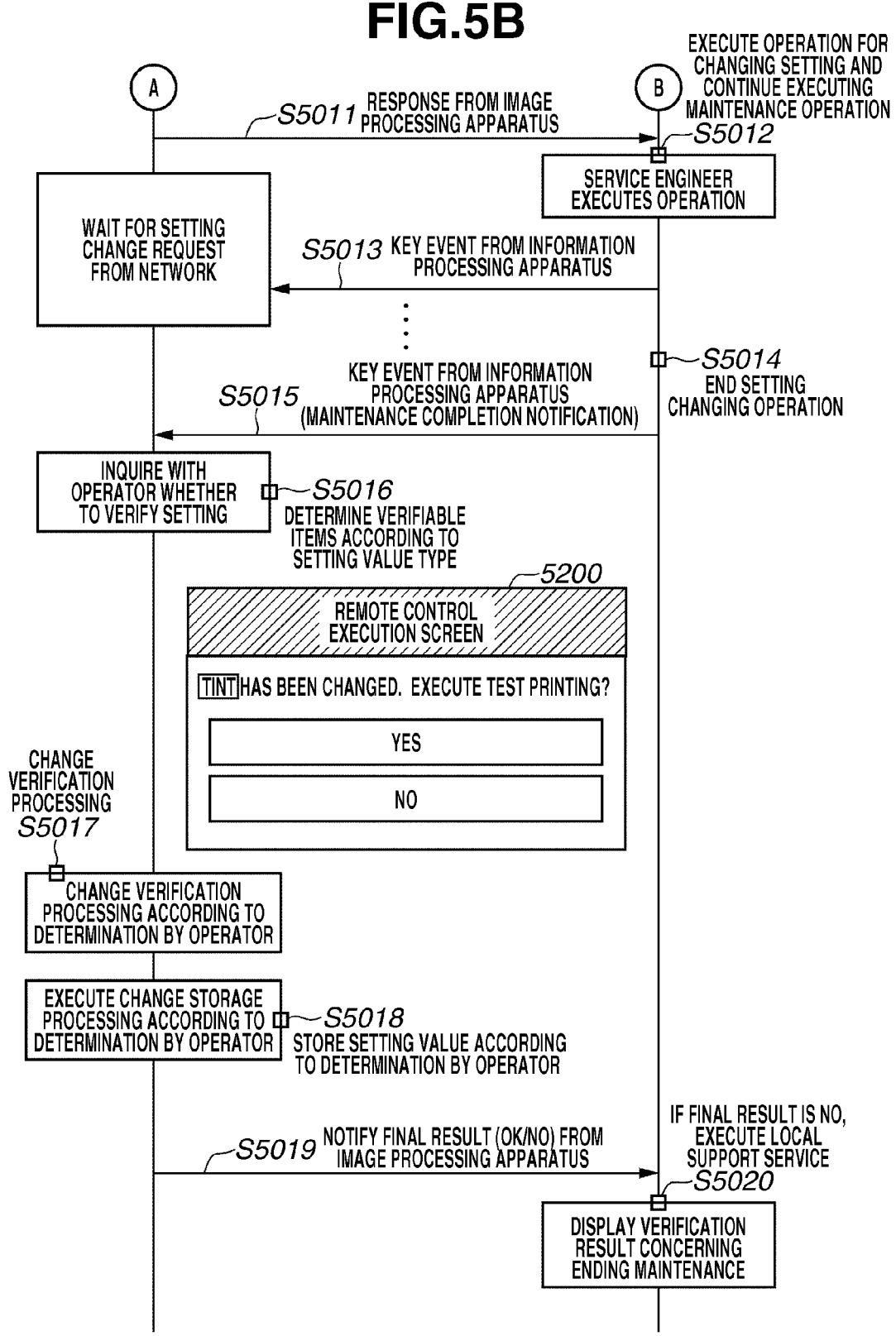

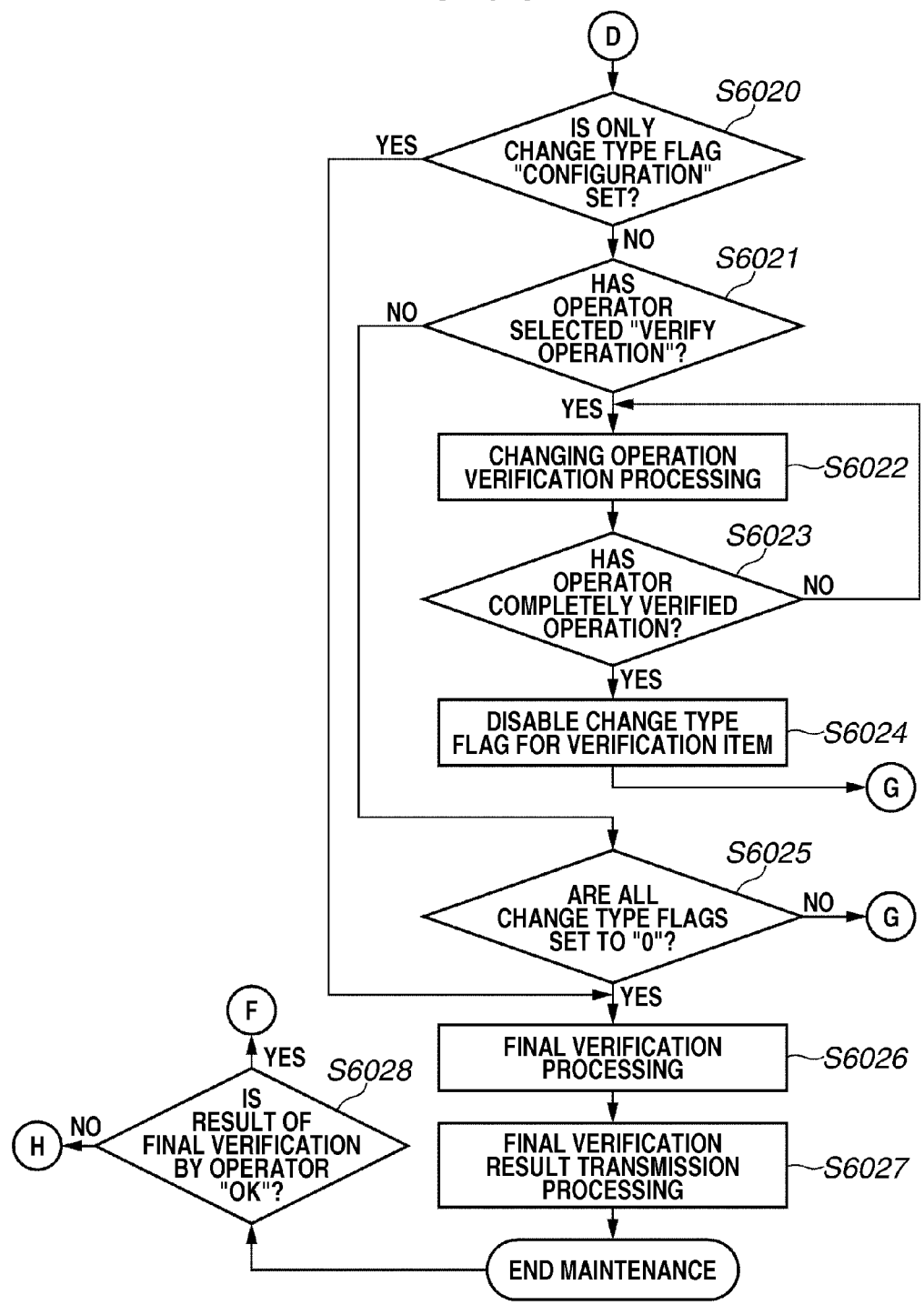

FIG.7B

```
EXECUTING REMOTE MAINTENANCE.
CHANGE SETTING
─────────────────────────────────────
CHANGING OF SERVICE SETTING VALUE HAS BEEN INSTRUCTED.
PERMIT CHANGING SETTING?

OK                    NO
```
~7004

```
EXECUTING REMOTE MAINTENANCE.
CHANGE SETTING
─────────────────────────────────────
CHANGING SETTING...

STOP
```
~7005

FIG.8A

| SETTING CATEGORY | SETTING ITEM ID | CHANGE TYPE | VERIFICATION ITEM |
|---|---|---|---|
| LAMP (LIGHT INTENSITY) | L-DATA, FL_OFST, ... | READING DENSITY | READING RESULT |
| AE (READING DENSITY) | AE-SLOP, AE-TBL, ... | READING DENSITY | READING RESULT |
| ADJ-XY (READING START POSITION) | ADJ-X, ADJ-Y, ... | READING POSITION | READING RESULT |
| CCD (ADJUST READING LIGHT INTENSITY) | PPR, W-PLT, ... | READING DENSITY | READING RESULT |
| LASER (ADJUST LASER INTENSITY) | PVE-OFST, LA-OFF, ... | PRINTING DENSITY | PRINTING RESULT |
| IMG-REG (WRITING POSITION) | REG-H-Y, REG-H-C, ... | PRINTING POSITION | PRINTING RESULT |
| DENS (AMOUNT OF APPLIED TONER) | SGNL-Y, SGNL-M, ... | PRINTING DENSITY | PRINTING RESULT |
| BLANK (IMAGE UNFORMED PORTION WIDTH) | BLANK-T, BLANK-H, ... | PRINTING POSITION | PRINTING RESULT |
| CONT (CONTRAST POTENTIAL) | VCONT-Y, VCONT-M, ... | TINT | PRINTING RESULT |
| COLOR (ADJUST TINT) | ADJ-Y, ADJ-M, ... | TINT | PRINTING RESULT |
| CST-ADJ (ADJUST CASSETTE) | C1-LVOL, C1HVOL, ... | CONFIGURATION | REBOOT |
| NETWORK (NETWORK SETTING) | NWCT-TM, REMOTE, ... | CONFIGURATION | REBOOT |
| SLEEP (SLEEP SETTING) | SLP_LVL, SLPOFF01, ... | — | — |
| .. | .. | .. | .. |

FIG.8B

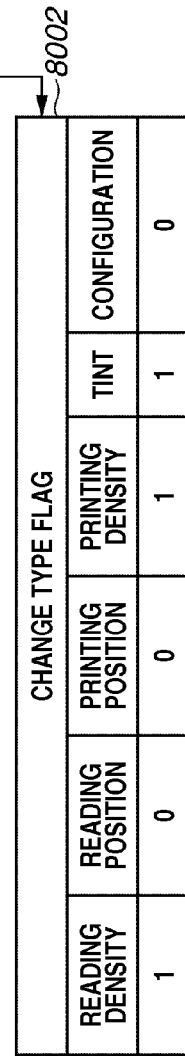

| CHANGE TYPE FLAG | | | | | |
|---|---|---|---|---|---|
| READING DENSITY | READING POSITION | PRINTING POSITION | PRINTING DENSITY | TINT | CONFIGURATION |
| 1 | 0 | 0 | 1 | 1 | 0 |

8002

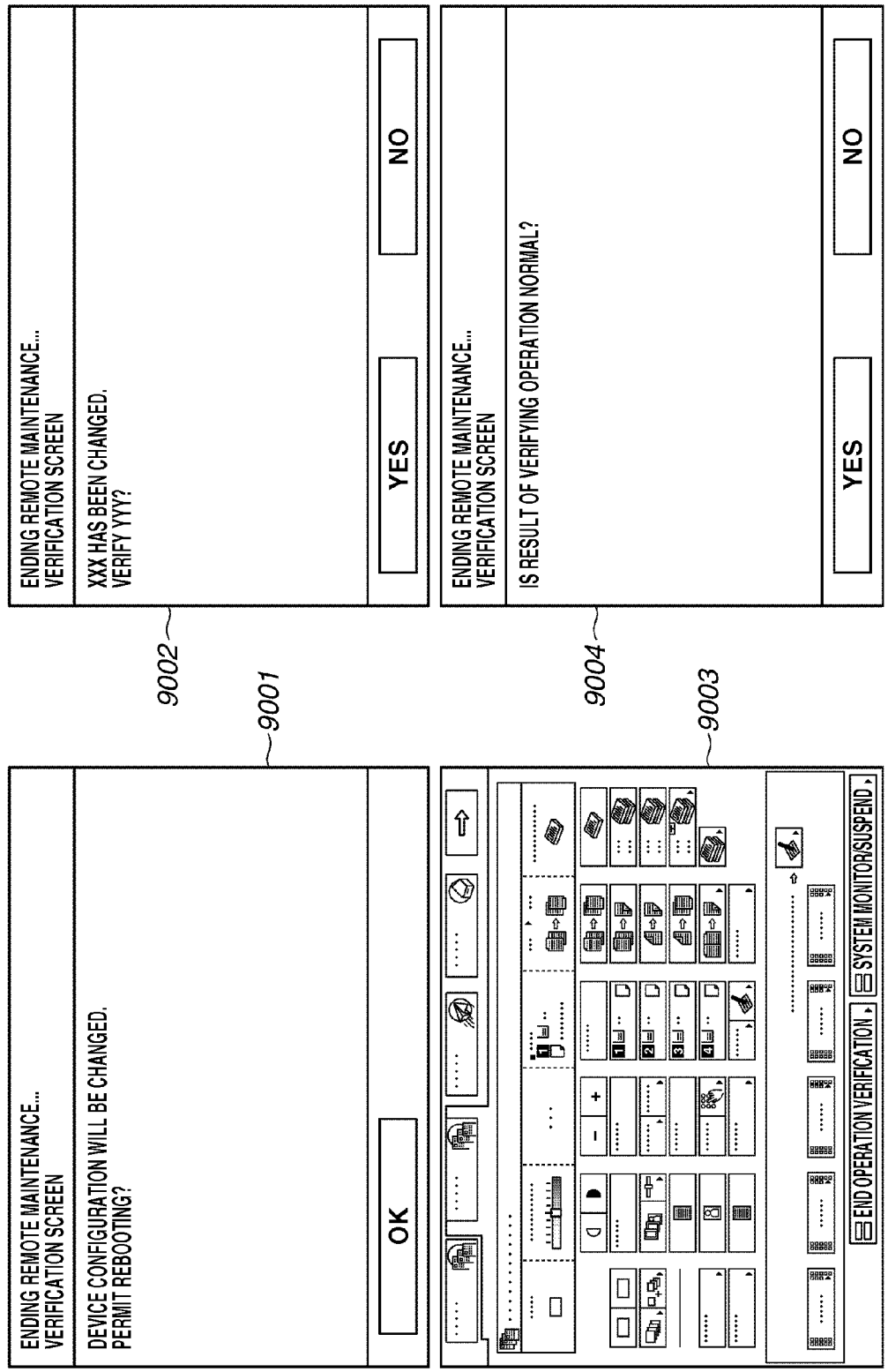

REMOTE CONTROL SYSTEM, IMAGE PROCESSING APPARATUS, CONTROL METHOD THEREFOR, AND RECORDING MEDIUM STORING PROGRAM THEREFOR

BACKGROUND OF THE INVENTION

1. Field of the Invention

The present invention generally relates to a remote control system including an image processing apparatus and an information processing apparatus connected with each other via a network, an image processing apparatus, a control method for the image processing apparatus, and a recording medium storing a program therefor.

2. Description of the Related Art

Conventionally, if a defective print or a defective reading has occurred on an image processing apparatus having a reading function and a printing function, and if a user has requested the maintenance of the image processing apparatus, a service engineer is generally dispatched to the installation location of the image processing apparatus to change and adjust a setting value for the image processing apparatus. In this case, the service engineer can directly operate the image processing apparatus to change the setting value for the image processing apparatus and execute test printing, test reading, and rebooting of the apparatus to apply the changed setting.

With the recent development of the network environment, a management method for executing a maintenance operation on an image processing apparatus connected to a network from a remote apparatus via the network has become more common. As a method for changing a setting value for an image processing apparatus from an external apparatus, a conventional method exists that controls the image processing apparatus remotely from a monitoring apparatus, by transmitting an operation screen displayed on an operation unit of the image processing apparatus to the monitoring apparatus (see Japanese Patent Application Laid-Open No. 05-122424).

In the conventional method discussed in Japanese Patent Application Laid-Open No. 05-122424, an operation screen of an image processing apparatus is transmitted to a monitoring apparatus in bit patterns and the image processing apparatus can be remotely controlled by indicating a predetermined position of a displayed bitmap image on the monitoring apparatus. In such a conventional method, an operation screen of an image processing apparatus installed in a remote place is displayed on an information processing apparatus, such as a personal computer (PC), via a network. Thus, the user can operate the image processing apparatus, view and verify information and data, and can execute remote control of the image processing apparatus. As a viewing application, a World Wide Web (WWW) browser and Virtual Network Computing (VNC) can be used.

However, in the above-described conventional method, if the remotely located monitoring apparatus changes the value set on the image forming apparatus, or compulsorily reboots the image forming apparatus via the network, then the user cannot recognize what setting or adjustment has been set or executed on the image forming apparatus. In this case, the user may feel disoriented because the user is not notified thereof.

Furthermore, the maintenance screen displayed for a service engineer may not be easy to understand. Accordingly, it may not be easy for the service engineer to predict what effect on the image processing apparatus may occur by changing the setting value for the image processing apparatus. In addition, it may be necessary to continue the maintenance operation if the problem to be solved (a failure item such as "printed on inappropriate position", "tint adjustment", or "density adjustment") has not been solved, after verifying whether the failure has been solved by the maintenance.

Therefore, the conventional methods do not enable changing a setting for an image processing apparatus and verifying whether the failure has been solved by changing the setting through an interactive communication via a network between a remote information processing apparatus connected to the image processing apparatus, which is the target of the remote control from the information processing apparatus.

SUMMARY OF THE INVENTION

According to an aspect of the present invention, in a remote control system configured to remotely control an image processing apparatus from an information processing apparatus via a network, the information processing apparatus includes a request receiving unit configured to receive a remote control request via the network, and an information transmission unit configured to, when the remote control request is received by the request receiving unit, transmit changing information for changing a setting value for the image processing apparatus, which is a target of remote control, via the network. The image processing apparatus includes a request transmission unit configured to transmit the remote control request to the information processing apparatus via the network, a detection unit configured to receive the changing information from the information processing apparatus via the network and detect a content of a change of the setting value based on the changing information, and a display unit configured to display a screen for prompting a user to determine whether to permit changing of the setting value according to the content of the change of the setting value detected by the detection unit.

According to another aspect of the present invention, an image processing apparatus, which is capable of being remotely controlled by an information processing apparatus via a network, includes a request transmission unit configured to transmit a remote control request to the information processing apparatus via the network, a detection unit configured to receive changing information for changing a setting value for the image processing apparatus from the information processing apparatus via the network and detect a content of a change of the setting value based on the changing information, and a display unit configured to display a message for prompting an operator of the image processing apparatus to determine whether to permit changing the setting value according to the content of the change of the setting value detected by the detection unit.

According to yet another aspect of the invention, a method for controlling an image processing apparatus capable of being remotely controlled by an information processing apparatus via a network, includes transmitting a remote control request to the information processing apparatus via the network, receiving changing information for changing a setting value for the image processing apparatus from the information processing apparatus via the network and detecting a content of a change of the setting value based on the changing information, and displaying a message for prompting an operator of the image processing apparatus to determine whether to permit changing of the setting value according to the content of the detected change of the setting value.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to describe principles of the present invention.

FIG. 4 is a block diagram illustrating an exemplary software configuration of the image processing apparatus according to an exemplary embodiment of the present invention.

FIG. 5B is a flow chart illustrating exemplary processing executed by the image processing apparatus and the information processing apparatus according to an exemplary embodiment of the present invention.

FIG. 6C is a flow chart illustrating exemplary processing for a remote maintenance executed by the image processing apparatus according to an exemplary embodiment of the present invention.

FIG. 7B illustrates an example of various screens displayed on the operation unit of the image processing apparatus according to an exemplary embodiment of the present invention.

FIG. 8A illustrates an example of an interactive determination table of the image processing apparatus according to an exemplary embodiment of the present invention.

FIG. 8B illustrates an example of a change type flag according to an exemplary embodiment of the present invention.

FIG. 9A illustrates an example of various screens displayed on the operation unit of the image processing apparatus according to an exemplary embodiment of the present invention.

DETAILED DESCRIPTION OF THE EMBODIMENTS

Various exemplary embodiments, features, and aspects of the present invention will now be herein described in detail below with reference to the drawings. It is to be noted that the relative arrangement of the components, the numerical expressions, and numerical values set forth in these embodiments are not intended to limit the scope of the present invention.

Figure 1:
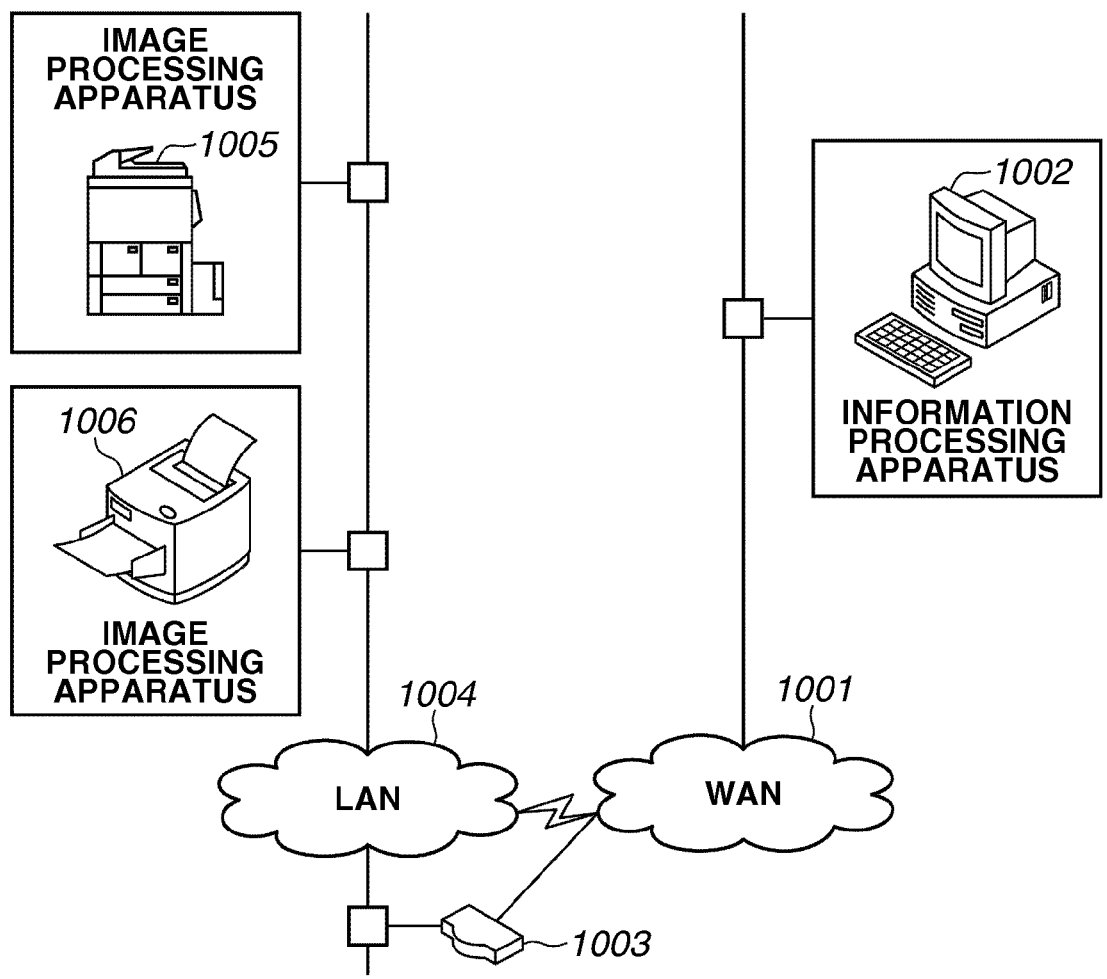
FIG. 1 illustrates an exemplary configuration of a remote control system according to an exemplary embodiment of the present invention.

FIG. 1 illustrates an exemplary configuration of a remote control system according to an exemplary embodiment of the present invention.

Referring to FIG. 1, the remote control system includes an information processing apparatus 1002, a router 1003, an image processing apparatus 1005, and an image processing apparatus 1006, which are connected to enable communication with each other via a wide area network (WAN) 1001 and a local area network (LAN) 1004.

The information processing apparatus 1002 and the router 1003 are connected to the WAN 1001. The image processing apparatus 1005 and the image processing apparatus 1006 are connected to the router 1003 via the LAN 1004. Note that it is may also be useful if the router 1003 has the function of a firewall.

The image processing apparatus 1005 according to this embodiment is a multifunction peripheral (MFP) including a plurality of functions, such as a reading function for reading an image from a document, a print function for printing an image on a sheet, and a copy function for copying the document image on a sheet.

The image processing apparatus 1006 according to this embodiment is a printer. The information processing apparatus 1002 according to this embodiment is a workstation including a central processing unit (CPU), a memory, a network interface, and a display unit. The information processing apparatus 1002 monitors if a connection request from one or more of the image processing apparatus 1005 and the image processing apparatus 1006 is received, and acquires a setting value therefrom.

Figure 2A:
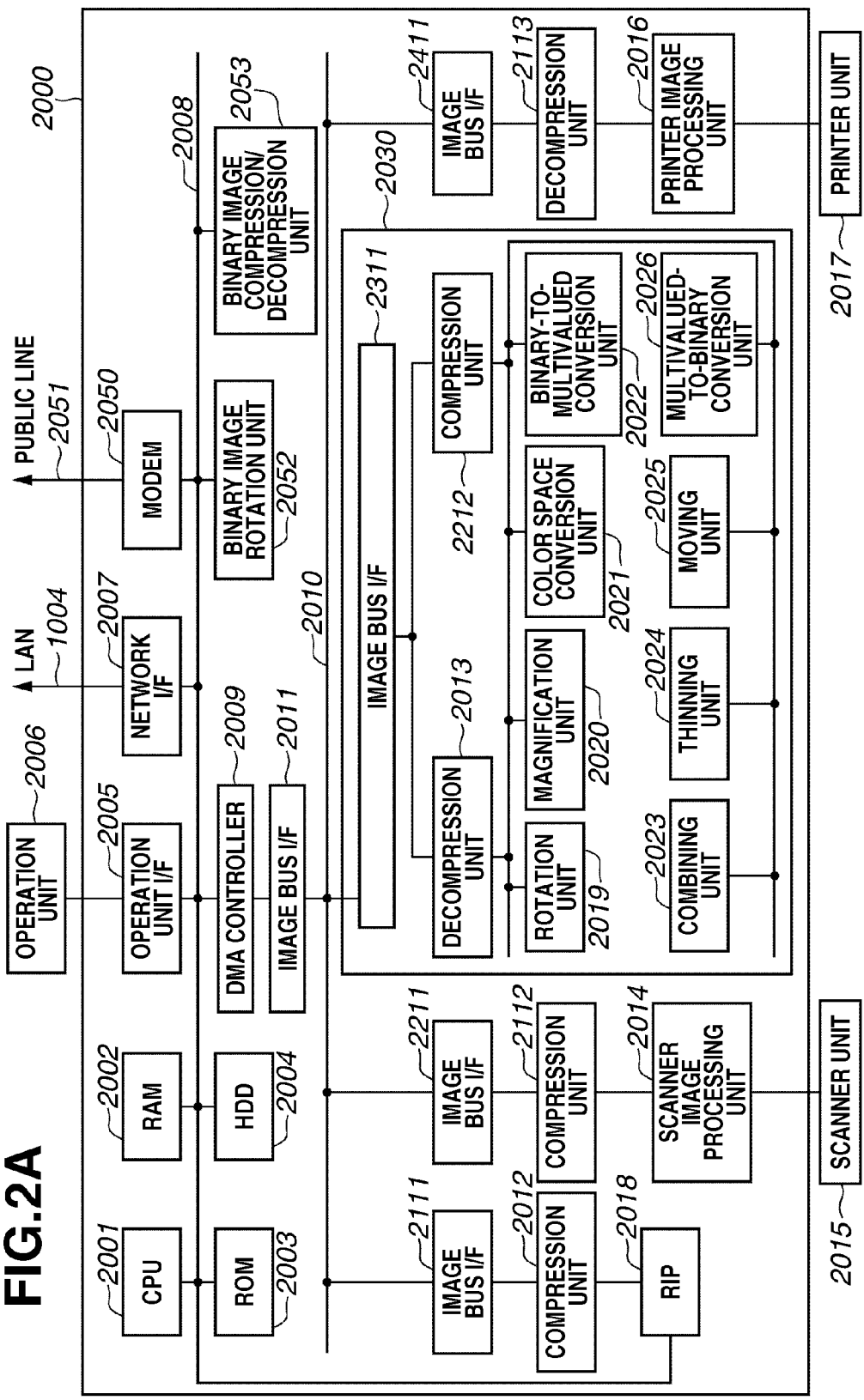
FIG. 2A is a block diagram illustrating an exemplary configuration of an image processing apparatus of the remote control system according to an exemplary embodiment of the present invention.

FIG. 2A is a block diagram illustrating an exemplary configuration of the image processing apparatus 1005 of the remote control system.

Referring to the exemplary configuration illustrated in FIG. 2A, the image processing apparatus 1005 includes a controller unit 2000, which controls each component and unit of the image processing apparatus 1005. The controller unit 2000 controls a scanner unit (i.e., image input device) 2015, which can read a color image of a document, and a printer unit (i.e., image output device) 2017, which can print the color image, to input and output image data and device information.

Furthermore, the controller unit 2000 is connected to the LAN 1004 and a public line 2051. In addition, the controller unit 2000 manages and controls software, as illustrated for example in FIG. 4.

A CPU 2001 controls the operation of the image processing apparatus. A random access memory (RAM) 2002 may be used as a system work memory for operating the CPU 2001 and an image memory for temporarily storing image data. Furthermore, the CPU 2001 may execute processing according to, for example, the flow chart illustrated in FIG. 5 and FIG. 6 (e.g., an operation executed by the image processing apparatus 1005). A read-only memory (ROM) 2003 stores a system boot program. A hard disk drive (HDD) 2004 stores system software and image data. An operation unit interface (hereinafter simply referred to as an "I/F") 2005 outputs image data to be displayed to the operation unit 2006. Furthermore, the operation unit I/F 2005 transmits information input by an operator of the image processing apparatus 1005 via the operation unit 2006 to the CPU 2001.

A network I/F 2007 is connected to the LAN 1004 and inputs and outputs information via the LAN 1004. The network I/F 2007 transmits the information input/output from/to the information processing apparatus 1002 to the CPU 2001.

A modem 2050 is connected to the public line 2051 and may be used to input and output image data. A binary image rotation unit 2052 and a binary image compression and decompression unit 2053 may be capable of converting the orientation of an image and converting the resolution of the image to a predetermined resolution or a resolution corresponding to the capacity of the communication target apparatus before transmitting binary image data via the modem 2050. The binary image compression and decompression unit 2053 supports the compression and decompression methods, such as one or more of Joint Bi-level Image Experts Group (JBIG), Modified Modified Read (MMR), Modified Read (MR), and Modified Huffman (MH).

A direct memory access (DMA) controller 2009 reads image data stored on the RAM 2002 by bypassing the CPU 2001. The read image data is transferred to an image bus I/F 2011. Furthermore, the DMA controller 2009 may write the image data transmitted from the image bus I/F 2011 on the RAM 2002 by bypassing the CPU 2001. The above-described components are connected to a system bus 2008.

A compression unit 2012 and a raster image processor (RIP) 2018 are connected to an image bus 2010 via the image bus I/F 2111. Furthermore, a compression unit 2112 and a scanner image processing unit 2014 are connected to the image bus 2010 via an image bus I/F 2211. In addition, an image conversion unit 2030 is connected to the image bus 2010 via an image bus I/F 2311. Furthermore, a decompression unit 2113 and a printer image processing unit 2016 are connected to the image bus 2010 via an image bus I/F 2411.

The image bus I/F 2311 can control the input and output of image data at a high speed via the image bus 2010. The compression unit 2212 can compress the image data with Joint Photographic Experts Group (JPEG) format in the unit of 32×32 pixels before transmitting the image data to the image bus 2010. A decompression unit 2013 can decompress the compressed image data transmitted via the image bus 2010.

According to this embodiment the RIP 2018 receives page description language (PDL) code transmitted from an external apparatus to the image processing apparatus 1005 via the network I/F 2007. The CPU 2001 stores the PDL code on the RAM 2002 via the system bus 2008. The CPU 2001 may further convert the PDL code into intermediate code. Then, the CPU 2001 inputs the intermediate code to the RIP 2018 via the system bus 2008 again to rasterize the intermediate code into a multivalued bitmap image.

The scanner image processing unit 2014 may execute image processing (e.g., at least one of correction, data-processing, and editing) on one or more of color image data and monochromatic image data, which are output from the scanner unit 2015, and may then output the image data as a multivalued image. The printer image processing unit 2016 executes image processing (e.g., at least one of correction, data processing, and editing) on the image data to be printed with the printer unit 2017. At the time of printing, the image data may be converted from binary image data to multivalued image data by the decompression unit 2013. Accordingly, a binary image and a multivalued image can be formed.

The image conversion unit 2030 can have various image conversion functions used in image-converting the image data stored on the RAM and rewriting the image data on the RAM. A rotation unit 2019 may be capable of rotating the image data in the unit of 32×32 pixels at a designated angle. The rotation unit 2019 can process the input and output of binary image data and multivalued image data. A magnification changing unit 2020 can include a function for converting the resolution of image data (e.g., from 600 dots per inch (dpi) to 200 dpi) and a function for changing magnification of the image data (e.g., from 25% to 400%). Before changing the magnification of the image data, 32×32 pixel image data may be arranged into image data in the unit of 32 lines.

A color space conversion unit 2021 can execute a matrix operation on the input multivalued image data. Thus, the color space conversion unit 2021 converts YUV image data stored on a memory, for example, into Lab image data by using a lookup table (LUT) and stores the converted image data on the memory. In addition, the color space conversion unit 2021 may have a 3×8 matrix operation function and a one-dimensional LUT. The color space conversion unit 2021 can execute background color removal processing and anti-offset processing. The converted image data may be output as multivalued image data.

A binary-to-multivalued conversion unit 2022 may convert 1-bit binary image data into 8-bit multivalued image data of 256 gradation levels. A multivalued-to-binary conversion unit 2026 may convert the multivalued 8-bit image data of 256 gradation levels into 1-bit binary image data of 2 gradation levels by using a method such as error diffusion processing, and stores the converted image data on the memory. A combining unit 2023 combines two pieces of multivalued image data on the memory into one piece of multivalued image data. For example, the combining unit 2023 can easily add a company log to an image read from a document by combining image data of the company log on the memory and the image data read from the document.

A thinning unit 2024 may convert the resolution of an image by thinning out pixels of multivalued image data. The thinning unit 2024 can output, for example, ½, ¼, and ⅛ multivalued images. If the thinning unit 2024 is used in combination with the magnification changing unit 2020, the image can be reduced or magnified in a wider range. A moving unit 2025 may add or remove a margin to and from the input binary/multivalued image data, and output the resulting image data.

In one version, the rotation unit 2019, the magnification changing unit 2020, the color space conversion unit 2021, the binary-to-multivalued conversion unit 2022, the combining unit 2023, the thinning unit 2024, the moving unit 2025, and the multivalued-to-binary conversion unit 2026, can operate by directly communicating with one another. For example, in executing image rotation processing and resolution conversion processing on the multivalued image data stored on the memory, the above-described components can directly communicate with each other to execute both processes by bypassing the memory.

Note that the program code of an algorithm used in the present exemplary embodiment may be stored in a part of system software on the HDD 2004 or on the ROM 2003.

Figure 2B:
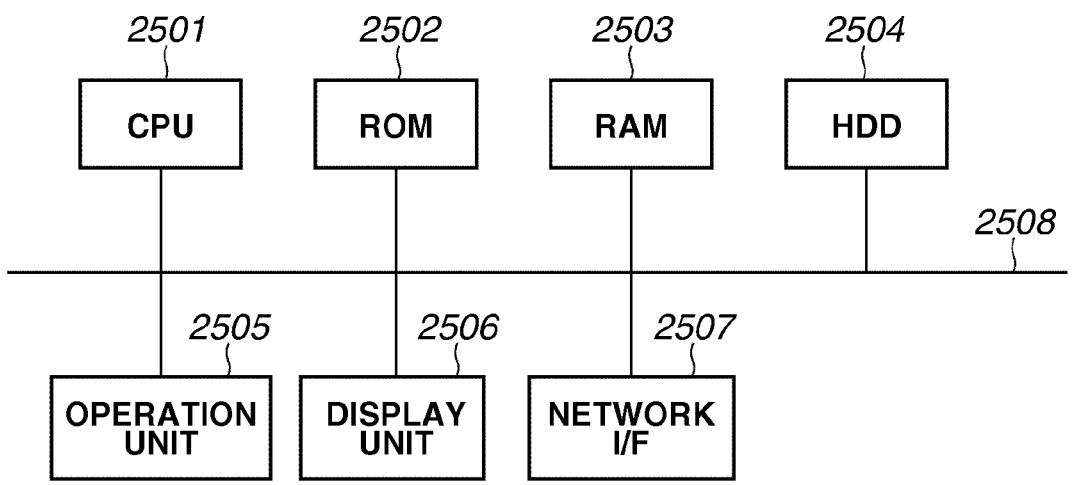
FIG. 2B is a block diagram illustrating an exemplary configuration of an information processing apparatus of the remote control system according to an exemplary embodiment of the present invention.

FIG. 2B is a block diagram illustrating an exemplary configuration of the information processing apparatus 1002 of the remote control system according to the present exemplary embodiment.

Referring to FIG. 2B, the information processing apparatus 1002 as shown includes a CPU 2501, a ROM 2502, a RAM 2503, a HDD 2504, an operation unit 2505, a display unit 2506, and a network I/F 2507. The CPU 2501 can control the information processing apparatus 1002 via a system bus 2508. The CPU 2501 may execute the processing illustrated in the flow chart in FIG. 5 (e.g., processing executed by the information processing apparatus 1002) according to the program. The ROM 2502 may store the program and fixed data.

According to the embodiment as shown, the RAM 2503 serves as a work area and a temporary storage area for the CPU 2501. The HDD 2504 stores the program and various data. The operation unit 2505 may be used for inputting various types of instructions and various data when a service engineer remotely operates the image processing apparatus and executes a remote maintenance operation thereof from the information processing apparatus via the network. The display unit 2506 displays various data including a setting value for the image processing apparatus based on the remote control executed by the CPU 2501. The network I/F 2507 executes data communication with the image processing apparatus, which is the target of the remote control, via the network.

Figure 3:
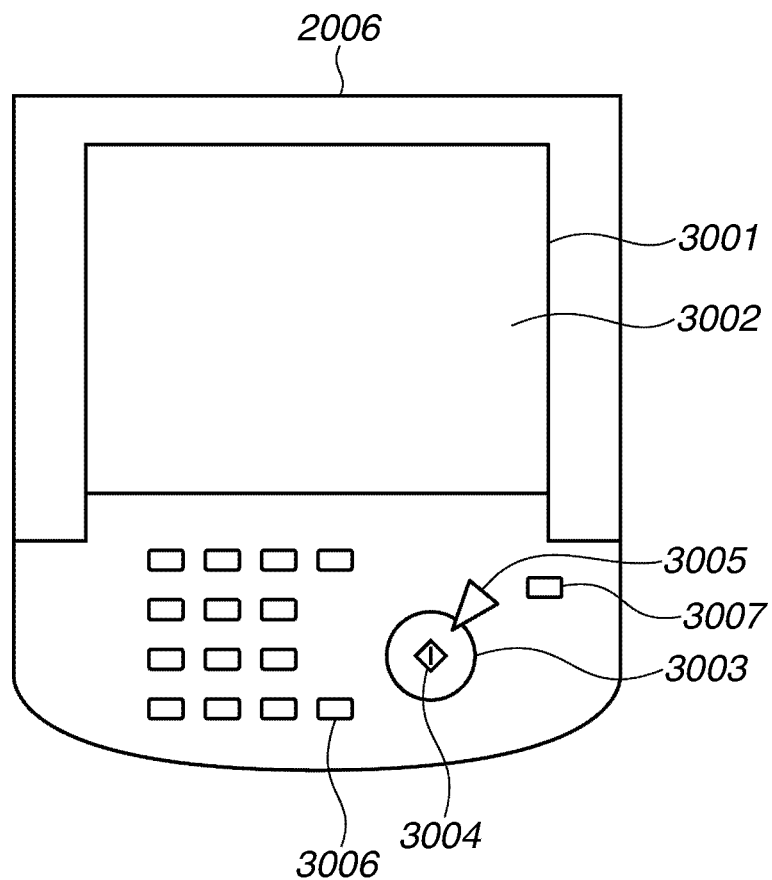
FIG. 3 illustrates an exemplary configuration of an operation unit of the image processing apparatus according to an exemplary embodiment of the present invention.

FIG. 3 illustrates an exemplary configuration of the operation unit 2006 of the image processing apparatus 1005 according to the present exemplary embodiment.

Referring to FIG. 3, the operation unit 2006 includes a display unit 3001 and various keys. The display unit 3001 may be a liquid crystal display (LCD) having a touch panel sheet 3002 attached on the surface thereof. The display unit 3001 displays various screens and soft keys as illustrated for example in FIGS. 7 and 9, which will be described in detail later below. When the operator presses one of the soft keys displayed on the display unit 3001, the positional information of the pressed key is transmitted from the operation unit 2006 to the CPU 2001 of the controller unit 2000.

A start key 3003 may be used for starting an operation of reading a document image. A light-emitting diode (LED) 3004 of two colors of green and red may be disposed in a central portion of the start key 3003. The color of the LED 3004 can indicate whether the start key 3003 can be used. A stop key 3005 maybe used for suspending the currently executed operation. An identification (ID) key 3006 may be used for inputting a user ID of a user. A reset key 3007 may be used for initializing a setting set from the operation unit 2006.

FIG. 4 is a block diagram illustrating an exemplary software configuration of the image processing apparatus 1005 according to the present exemplary embodiment.

Referring to FIG. 4, a user interface (UI) control unit 4001 controls an input from the operation unit 2006. When the operator inputs an instruction through the operation unit 2006, each application program (hereinafter simply referred to as an "application") may be activated according to the function displayed on a screen of the operation unit 2006, such as a copy function, sending function, and box function.

According to this exemplary embodiment, in executing a scan job and a print job, a copy application 4003 and a box application 4002 operate. In executing a transmission job, a data transmission and reception application 4004 operates. When an instruction for receiving data is received via the network, a network application 4005, a PDL application 4006, and a data transmission and reception application 4004 operate.

Each application may generate a job via a common I/F 4007, which is used for solving image processing apparatus-dependent processing executed by the components and units controlled in the image processing apparatus. The generated job may be stored on a job management unit 4008. The job management unit 4008 may manage job information received from the common I/F 4007 and the generated job by classifying them according to the type of the job. A copy job management unit 4009, a scan job management unit 4010, a print job management unit 4011, a PDL job management unit 4012, a transmission job management unit 4013, and a facsimile transmission job management unit 4014 may be provided to manage each type of job.

Furthermore, the job management unit 4008 may issue a request for executing processing related to a scan job or a print job to each page processing unit that executes processing for each page. In executing a copy job, the job management unit 4008 may issue a request for executing corresponding processing on each page from the copy job management unit 4009 to the scan page processing unit 4015, the image page processing unit 4020, and the print page processing unit 4019. The image page processing unit 4020 can synchronize the scan page processing unit 4015 and the print page processing unit 4019. Furthermore, the image page processing unit 4020 may acquire a resource (e.g., memory devices 4022 for image processing and image conversion devices 4023 that executes various types of image processing) from a resource management unit 4021 and execute image processing.

The resource management unit 4021 according to this embodiment includes a device management unit 4024 and a memory management unit 4025. The device management unit 4024 stores the state of use of the image conversion devices 4023 and the priority of the users. The memory management unit 4025 stores the state of use of the memory devices 4022 and the priority of the users. The resource management unit 4021 may execute scheduling of the assignment of the resources according to a request for acquiring and releasing the resource to control the assignment of the resources. Furthermore, the resource management unit 4021 may determine whether the resource can be acquired, and may reserve the acquisition of the resource before executing the job. In addition, the resource management unit 4021 can execute exclusive control of the resource so as not to allow another apparatus to acquire the resource before completing the job.

A document management unit 4026 stores an attribute value indicating the attribute of each of a job, a document, a page, and an image in a static random access memory (SRAM) device 4028 and controls the writing and reading of image data on and from an HDD device 4027. The scan page processing unit 4015 can control a scan device control unit 4029 to input the image data read from the document with the scanner unit 2015. In addition, the scan page processing unit 4015 may request the image page processing unit 4020 for executing image processing of the image data and writing thereof.

A PDL page processing unit 4016 may control an RIP device control unit 4030 to input PDL data from the network and to request the image page processing unit 4020 to perform image-processing and writing of the input image data. A print page processing unit 4019 can request the image page processing unit 4020 to perform reading and image-processing of the image data, and may control a printer device control unit 4033 to print the image data on a paper sheet by using the printer unit 2017.

In transmitting the image data, a transmitted/received page processing unit 4017 requests the image page processing unit 4020 for reading the image data and executing the image processing and controls the network device control unit 4031 to output the image data to the network. Furthermore, in receiving the image data, the transmitted/received page processing unit 4017 inputs the image data from the network device control unit 4031, and requests the image page processing unit 4020 for image-processing and writing the image data.

In transmitting the image data, a FAX page processing unit 4018 requests the image page processing unit 4020 for reading and image-processing the image data, and controls a FAX device control unit 4032 to output the image data to the public line. Furthermore, in receiving the image data, the FAX page processing unit 4018 inputs the image data from the public line and requests the image page processing unit 4020 for writing and image-processing the image data.

Now, software processing for local copying (e.g., copying processing for directly outputting image data to the image processing apparatus by bypassing the network) executed in the present exemplary embodiment having the above-described configuration will be described in detail later below. When the operator has issued an instruction, the UI control unit 4001 may transmit the copy instruction and information indicating a copy setting to the copy application 4003. The copy application 4003 can transmit the information received from the UI control unit 4001 to the job management unit 4008 via the common I/F 4007.

The job management unit 4008 transmits the information about the copy job to the copy job management unit 4009. The copy job management unit 4009 computes the image conversion device and the image storage memory for the copy job and notifies the resource management unit 40211 of the device and memory capacity for the copy job. If it is likely that the resource can be acquired by the resource management unit 4021, then the copy job management unit 4009 may continue the job and transmit the information about the copy job to the scan page processing unit 4015 and the print page processing unit 4019.

The scan page processing unit 4015 issues a scan request to the scanner unit 2015 for requesting reading of a document image via the scan device control unit 4029.

Note that the scan device control unit 4029 can control a serial I/F for connecting the controller unit 2000 and the scanner unit 2015. Furthermore, the scan page processing unit 4015 may issue an image processing request for scanning to the image page processing unit 4020.

The image page processing unit 4020 acquires, from the resource management unit 4021, the image conversion device and the image storage memory for the scan image processing for processing the image read from the document according to the instruction issued from the scan page processing unit 4015. If all the resources have been successfully acquired, then the image page processing unit 4020 executes the setting on the scanner image processing unit 2014 via the image conversion device. When the setting has been completed, the image page processing unit 4020 instructs the scanner unit 2015 to immediately start scanning. A scan image transfer completion notification is transmitted to each image conversion device by an interruption signal from hardware.

After receiving a scan image processing completion notification from each image conversion device, the image page processing unit 4020 notifies the scan page processing unit 4015 and the print page processing unit 4019 that the scanning has been completed. At the same time, the image page processing unit 4020 issues an instruction for writing the image data to the document management unit 4026 so as to store the compressed image data, which is stored on the RAM 2002, on the HDD 2004 as a file.

The document management unit 4026 stores the image data (e.g., including a signal for determining whether the data is text data or a photographic image) on the memory of the HDD device 4027 (e.g., the HDD 2004 as hardware) according to the instruction. In addition, a result of the determination as to the color of the scanned image data (e.g., whether the image data is color image data or monochromatic image data), a background removal level for determining whether to remove the background of the image, the scan image of the document (e.g., image data input source), and color space RGB data may be stored on the SRAM device 4028.

Furthermore, when the image data is completely stored on the HDD 2004 and a scan completion notification is received from the scanner unit 2015, the image page processing unit 4020 notifies the scan page processing unit 4015 that the image data has been stored as a file. Then, the scan page processing unit 4015 notifies the file generation processing completion notification to the copy job management unit 4009. The job management unit 4008 transmits the scanning completion notification to the copy application 4003 via the common I/F 4007. Then, the job management unit 4008 instructs to release the resource used for the scanning via the resource management unit 4021.

On the other hand, the print page processing unit 4019 controls the device I/F via the printer device control unit 4033 when the image data is input to the memory of the memory devices 4022 (e.g., the RAM 2002 as the hardware) and issues a print request to the printer unit 2017. The print page processing unit 4019 requests and instructs print image processing to the image page processing unit 4020.

When receiving the request from the print page processing unit 4019, the image page processing unit 4020 acquires the image conversion device and the image storage memory for the print image processing from the resource management unit 4021 according to the instruction. If all resources have been successfully acquired, then the image page processing unit 4020 executes the setting of the printer image processing unit 2016 via the acquired image conversion device. When the setting of the printer image processing unit 2016 is completed, the image page processing unit 4020 notifies the print page processing unit 4019 that the printing is ready.

The print page processing unit 4019 issues a print instruction to the printer unit 2017. After receiving the print image processing completion notification from each image conversion device, the image page processing unit 4020 notifies the print page processing unit 4019 that the printing image data has been completely transferred and printed. After receiving a printed paper discharge completion notification from the printer device control unit 4033, the print page processing unit 4019 notifies the copy management unit 4009 of the print processing completion.

The job management unit 4008 transmits the print completion notification to the copy application 4003 via the common I/F 4007. When the scanning and printing are completed, the copy application 4003 notifies the UI control unit 4001 that the job has been completely executed.

When a scan job or a fax transmission job by remote copy (e.g., processing for executing copying on the image processing apparatus based on an instruction from a remote apparatus connected to the image processing apparatus via the network) is executed, the following processing may be executed. That is, instead of the print page processing unit 4019, the transmitted/received page processing unit 4017 and the FAX page processing unit 4018 may receive the request from the job management unit 4008. Furthermore, the transmitted/received page processing unit 4017 and the FAX page processing unit 4018 may receive a storage completion notification from the image page processing unit 4020 when the scan image data is completely stored on the HDD 2004.

In the case of the remote copy processing, the page processing unit 4008 may issue the storage completion notification to the copy application 4003 via the common I/F 4007. In the case of the transmission job, the page processing unit 4008 may issue the storage completion notification to the data transmission and reception application 4004 via the common I/F 4007. The copy application 4003 and the data transmission and reception application 4004 issue a request for transmitting the file stored on the HDD 2004 to the transmitted/received page processing unit 4017 via the common I/F 4007 after the above-described notification. After receiving the request, the transmitted/received page processing unit 4017 activates the network device control unit 4031 to transmit a file.

The data transmission and reception application 4004 receives setting information about the copy job from the copy application 4003, when the job starts, and notifies the remote apparatus of the received setting information. In the case of remote copy, the data transmission and reception application 4004 may transmit the data using a communication protocol unique to the device. In the case of other transmission jobs, a standard file transmission protocol such as File Transfer Protocol (FTP) or Server Message Block (SMB) can be used. In the case of a facsimile transmission job, after the file has been stored, it is notified that the image data has been transmitted from the data transmission and reception application 4004 to the FAX job management unit 4014 of the job management unit 4008 via the common I/F 4007.

The FAX job management unit 4014 reads the image information for transmission from the SRAM device 4028 via the document management unit 4026. The FAX job management unit 4014 extracts image information having a largest page size among the image information to be transmitted, determines the memory size and the image conversion device for the job, and executes the reservation of the resource by using the resource management unit 4021. If the resources have been successfully reserved by the resource management unit 4021, then the FAX job management unit 4014 may immediately start the job, and instructs the FAX page processing unit 4018 to transmit the data. On the other hand, if the resource (e.g., the line, the memory device, and the image conversion device) have not been successfully reserved, then the FAX job management unit 4014 manages the job as a transmission waiting job until the next activation.

When receiving the transmission instruction, the FAX page processing unit 4018 controls the FAX device control unit 4032 to execute a negotiation with a communication counterpart apparatus via the modem 2050. The FAX page processing unit 4018 determines the image processing for the job (e.g., one or more of conversion from color image to monochromatic image, conversion from multivalued to binary image data, rotation, and change of magnification), based on a result of the negotiation, and requests the image page processing unit 4020 to execute the processing. The image page processing unit 4020 acquires the image conversion device and memory device reserved by the resource management unit 4021 and issues an image conversion request to the image conversion device.

After the image conversion is completed by the image conversion device and when a conversion notification is received, the FAX page processing unit 4018 transmits the converted image data by using the modem 2050 via the FAX device control unit 4032.

If the image processing apparatus (e.g., printer) 1006 is designated as the image data transmission destination, then the data transmission and reception application 4004 may transmit the image data to the printer 1006 via the common I/F 4007 as a print job, and instruct printing of the image data. The operation executed in this case is similar to that executed in the print job by the remote copy described below. On the other hand, if the box in the image processing apparatus is designated as the image data transmission destination, then the image data may be stored in a file system of the image processing apparatus via the document management unit 4026.

In receiving a facsimile, the FAX device control unit 4032 receives the image data via the modem 2050 and stores the received image data on the HDD device 4027 as an image file. Then, the FAX device control unit 4032 stores the image file on the SRAM device 4028 as image information. After storing the image file on the HDD device 4027, the FAX device control unit 4032 notifies the box application 4002 of that fact. The box application 4002 transmits the instruction, which is received via facsimile, for printing to the job management unit 4008 via the common I/F 4007. After that, a similar operation to that in a normal box print job may be executed. Accordingly, the description thereof will not be repeated here.

When a print job is executed by remote copying, the network application 4005 stores the image data received from the data transmitting apparatus on the HDD 2004. The network application 4005 also issues a job to the copy application 4003. The copy application 4003 inputs the print job to the job management unit 4008 via the common I/F 4007. In the case of remote copying, the scan page processing unit 4015 may not be used, contrary to the case of executing local copying. In this case, the image page processing unit 4020 receives a request from the copy job management unit 4009.

The copy job management unit 4009 issues a request to the image page processing unit 4020 for rasterizing the image data, which is received from the data transmitting apparatus, from the HDD 4027 on the memory device on the memory devices 4022. The image page processing unit 4020 acquires the memory device for the job from the memory devices 4022 and rasterizes the image data on the memory device. When the rasterization of the image data is completed, the image page processing unit 4020 notifies the print page processing unit 4019 of that fact.

The print page processing unit 4019 may start controlling the printer device control unit 4033 when the image data is input to the memory device of the memory devices 4022.

The printer device control unit 4033 issues, to the printer unit 2017 via the device I/F, a print request for feeding a sheet from a paper feed cassette instructed by the copy job management unit 4009 (or a paper feed cassette of a corresponding appropriate paper size) and for executing printing. In the case of an auto paper select mode, in which the paper size is not manually designated, the printer device control unit 4033 may determine the paper feed cassette to feed the sheet according to the size of the image read from the document, and may issue the print request for feeding a sheet from the determined paper feed cassette.

Then, the print page processing unit 4019 issues a request for executing print image processing to the image page processing unit 4020. The image page processing unit 4020 acquires the image conversion device and the memory device for the print image processing job from the image conversion devices 4023 and the memory devices 4022. Furthermore, the image page processing unit 4020 sets settings for print image processing on each image conversion device. If a rotation operation is to be executed, for example because the sheets of the appropriate size have been completely consumed, the image page processing unit 4020 also acquires the rotation device. After that, a similar operation to that in a normal box print job may be executed. Accordingly, the description thereof will not be repeated here.

In executing a job for rasterizing and storing PDL data, a request from the device that has input the PDL print job (e.g., a host PC) is transmitted to the PDL application 4006 via the network application 4005. The PDL application 4006 instructs the job management unit 4008 to execute the PDL data rasterization and storage job via the common I/F 4007. The job management unit 4008 issues a request to the image page processing unit 4020 and the PDL page processing unit 4016. The processing for inputting an image after the RIP processing on the image may be completed is similar to that in the case of the above-described scan job.

The image page processing unit 4020 may store the image data, which is on the memory device of the memory devices 4022 (including, e.g., a signal for determining whether the data is text data or a photographic image), on the HDD 2004 via the document management unit 4026. Information about whether the image data is color image data or monochromatic image data may be stored on the SRAM device 4028 as the additional information for the image. The PDL image data and the color space data (e.g., CMYK data or RGB data) may be stored on the SRAM device 4028 as the image input source. After the PDL image data is completely stored on the HDD 2004, the image page processing unit 4020 notifies the PDL application 4006 of the completion of the storage via the common I/F 4007.

After receiving the notification, the PDL application 4006 notifies the network application 4005 that the PDL image data has been completely stored on the HDD 2004. Thus, the network application 4005 notifies the device on which the PDL print job has been input (e.g., the host PC) that the PDL image data has been completely stored on the HDD 2004. Furthermore, in the case of a PDL print job, the PDL page processing unit 4016 and the print page processing unit 4019 may print the image rasterized on the memory device of the memory devices 4022.

In printing the image data that has been rasterized into PDL data and stored on the HDD, a print job for printing the stored document that is instructed by the operation unit 2006 to be printed is issued to the box application 4002. The box application 4002 inputs the print job to the job management unit 4008 via the common I/F 4007. The processing to be executed thereafter may be similar to that of the print job in the case of remote copying. Accordingly, the description thereof will not be repeated here.

Furthermore, each of the control units 4029 through 4033 may sometimes refer to a setting value stored on the image processing apparatus (e.g., at least one of the setting for the reading density, the amount of applied toner, and the tint adjustment value) when executing a job. In this case, each control unit 4029 through 4033, and each processing unit 4008 through 4020, requests the setting value management unit 4034 to read the setting value.

The setting value management unit 4034 manages which setting value is stored on which device (e.g., the HDD device 4027 or the SRAM device 4028) and on what location (e.g., storage area of the device). The setting value management unit 4034 transmits the setting value thereto in response to the request thereof. Furthermore, the setting value management unit 4034 can change the setting value according to the request for changing the setting value from the UI control unit 4001 and the network application 4005.

An exemplary configuration of the remote control system according to the present exemplary embodiment may have the following features.

The information processing apparatus receives a request for executing remote control via the network. Furthermore, after receiving the request for executing remote control via the network, the information processing apparatus issues an event (i.e., remote control information) for changing the setting value (e.g., at least one of the reading density, the reading start position, the amount of applied toner, and the tint adjustment value) of the image processing apparatus that is the target of the remote control via the network. In other words, the information processing apparatus may transmit changing information for changing the set value to the image processing apparatus via the network.

The image processing apparatus transmits the remote control request via the network. Furthermore, the image processing apparatus may receive a plurality of events (e.g., remote control information) via the network, and can store the received events.

Furthermore, the image processing apparatus determines whether to display a dialog input screen (i.e., remote control execution screen) for prompting the user to permit changing of the setting value according to the content of the change that may be executed on the setting value upon receiving the event (e.g., remote control information). Furthermore, the image processing apparatus displays messages for serially prompting the operator (i.e., user) to designate an operation for changing a plurality of setting values detected based on a plurality of pieces of remote control information via the dialog input screen. The operations may be grouped and displayed serially in each group of similar operations.

Furthermore, if the operator inputs an instruction permitting the changing of the setting value via the dialog input screen, the image processing apparatus may execute control for applying the changed setting value thereto. If the operator inputs an instruction for inhibiting the change of the setting value via the dialog input screen, the image processing apparatus may execute control to inhibit the setting value from applying thereto.

Furthermore, the image processing apparatus may display a message for prompting the operator to determine whether to permit the change of a setting value that is related to the image forming process, such as at least one of the reading density for reading a document, the tint of the image to be printed, the amount of a developer (e.g., toner) to be applied when printing, and the print position on the sheet. On the other hand, the image processing apparatus may not display a message for prompting the operator thereof with respect to the change of a setting value that is not related to the image forming process (i.e., related to the user mode).

For example, the setting values for the user mode, such as one or more of the setting value for determining whether to display a default screen of the image processing apparatus, the waiting time for shifting to the sleep mode of the apparatus, and the paper size, can be remotely set by the service engineer without inquiring of the operator whether to permit the change of the setting value. On the other hand, the setting value for one or more of the reading density, the amount of applied toner, and the tint of the image processing apparatus, may not be set remotely without inquiry of the operator by the service engineer. Thus, the service engineer may acquire permission from the operator for changing the setting values, such as the setting value for at least one of the reading density, the amount of applied toner, and the tint of the image processing apparatus.

Furthermore, with respect to the change of the setting value related to the configuration of the image processing apparatus, such as for example one or more of a sheet stacking amount on the paper feed cassette and a network address of the image processing apparatus, the image processing apparatus may display a message for prompting the operator to determine whether to reboot the image processing apparatus after applying the changed setting thereto. In addition, when transmitting a remote control request to the information processing apparatus, the image processing apparatus may control (e.g., inhibit) the input of an instruction for suspending a job currently processed by the image processing apparatus and may control (e.g., inhibit) the receiving of the input of an operation on the image processing apparatus.

Now, the remote control system according to the present exemplary embodiment having the above-described configuration will be described in further detail below.

To begin with, processing executed by the image processing apparatus 1005 and the information processing apparatus 1002, when the service engineer executes a remote maintenance operation by remotely operating the image processing apparatus 1005 from the information processing apparatus 1002 via the network, will be described in detail below with reference to FIGS. 5A and 5B.

Figure 5A:
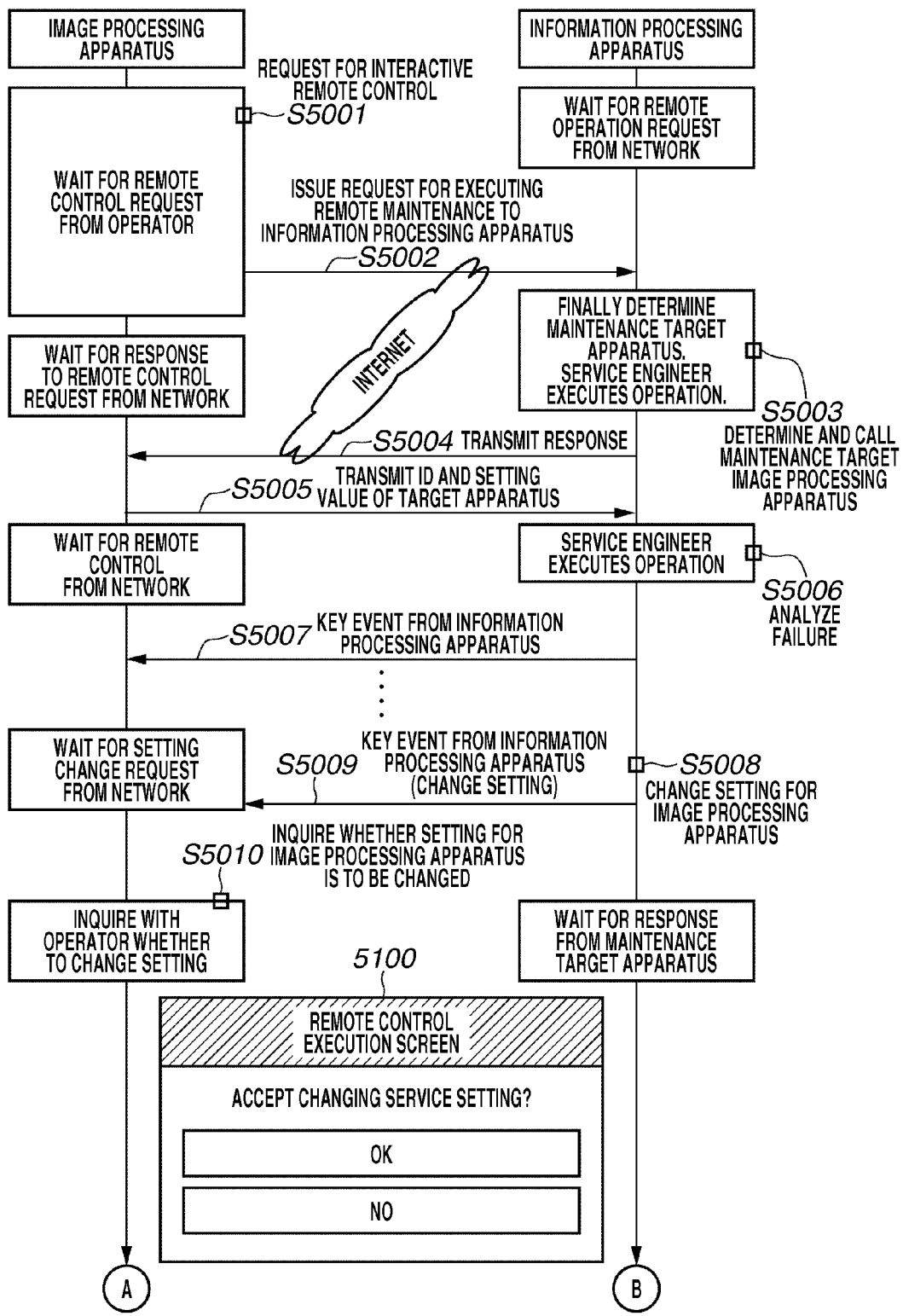
FIG. 5A is a flow chart illustrating exemplary processing executed by the image processing apparatus and the information processing apparatus according to an exemplary embodiment of the present invention.

Each of FIGS. 5A and 5B is a flow chart illustrating an example of the processing executed by the image processing apparatus 1005 and the information processing apparatus 1002 according to the present exemplary embodiment.

Referring to FIGS. 5A and 5B, in step S5001, the image processing apparatus 1005 displays a remote maintenance button (e.g., refer to FIG. 7A) on the display unit 3001 of the operation unit 2006 during a normal operation mode, and waits until a request for interactive remote control is received. If an incidence that requires the maintenance of the image processing apparatus 1005 has occurred on the image processing apparatus 1005, the operator presses the remote maintenance button displayed on the display unit 3001 of the image processing apparatus 1005.

If the remote maintenance is pressed by the operator, the image processing apparatus 1005 executes the following operation so as to inhibit an operation on a screen of the display unit 3001 of the operation unit 2006 during the remote maintenance. That is, in this case, the image processing apparatus 1005 activates an application program (hereinafter simply referred to as an "application") and a remote control agent, which operates in an upper layer of a normal screen (e.g., a password input screen or the like).

The application may be a display control application executed by the UI control unit 4001 (e.g., refer to FIG. 4). As illustrated later below in FIGS. 7 and 9, the application may implement interactive communication between the image processing apparatus and the operator by displaying a screen that enables inputting a dialog for making an inquiry of the operator on the display unit 3001 of the operation unit 2006.

The remote control agent may be a submodule of the network application 4005 (e.g., refer to FIG. 4). The remote control agent interprets information received from the network, and executes processing for transmitting the event issued based on a result of the interpretation of the information and processing for temporarily or permanently storing the setting value via the setting value management unit 4034.

According to this embodiment, the application of the image processing apparatus 1005 displays a message "Calling. Please wait.", for example, on the display unit 3001 of the operation unit 2006. In step S5002, the application of the image processing apparatus 1005 issues a remote maintenance request to the information processing apparatus 1002 via the network. At this time, the remote control agent waits for a response to the remote maintenance request from the network. Furthermore, in step S5002, the application suspends (i.e., temporarily stops) the job currently being processed on the image processing apparatus 1005 and inhibits receiving of the input of information from the network and the public line, and inhibits receiving a key input from the operation unit 2006, so that a new job is not input on the image processing apparatus 1005.

When receiving a remote maintenance request for the image processing apparatus 1005 in the state of waiting for a remote control request from the network, the information processing apparatus 1002 displays a screen for prompting the service engineer to determine whether to execute the remote maintenance of the image processing apparatus 1005 on the display unit 2506.

In step S5003, the connection between the information processing apparatus 1002 and the image processing apparatus 1005 is established according to the operation by the service engineer via the operation unit 2505 and the display unit 2506. More specifically, the information processing apparatus 1002 determines a remote maintenance target image processing apparatus 1005 and calls the image processing apparatus 1005. In step S5004, the information processing apparatus 1002 transmits a response to the remote maintenance target image processing apparatus 1005 via the network.

The remote control agent of the image processing apparatus 1005 receives the response from the information processing apparatus 1002 via the network. Furthermore, the remote control agent periodically acquires a key event by the remote control from the information processing apparatus 1002 at a predetermined time interval and displays a message such as for example "Remote maintenance is currently executed. Please wait.", on the display unit 3001 of the operation unit 2006. In step S5005, the remote control agent transmits a device ID uniquely set to the remote maintenance target apparatus (i.e., the image processing apparatus 1005) and the setting values (e.g., at least one of the reading density, the amount of applied toner, and the tint adjustment value) to the information processing apparatus 1002.

In step S5006, the information processing apparatus 1002 identifies the device type or the device model type of the image processing apparatus 1005 based on the device unique ID received from the image processing apparatus 1005 via the network and displays the identified information on the display unit 2506 for the service engineer. The service engineer analyzes the state of the failure occurring on the image processing apparatus 1005 by comparing the setting value received from the image processing apparatus 1005 and the symptom of the failure previously notified of by the operator of the image processing apparatus 1005.

The service engineer remotely operates the image processing apparatus 1005 via the operation unit 2505 and the display unit 2506 of the information processing apparatus 1002 to solve the failure of the image processing apparatus 1005. In step S5007, the information processing apparatus 1002 issues a key event according to the operation by the service engineer via the network.

The remote control agent of the image processing apparatus 1005 acquires the key event issued from the information processing apparatus 1002 via the network and interprets the received key event. When the remote control agent has interpreted the key event and executed the processing corresponding to the key event, the application may shift the screen displayed on the display unit 3001 from the sublayer screen to a service mode screen.

On the information processing apparatus 1002, the service engineer identifies the state of failure occurring in the image processing apparatus 1005. Thus, the state of the failure occurring in the image processing apparatus 1005 is identified by the service engineer. If the state of the failure can be adjusted by changing the setting value for the image processing apparatus 1005, then the processing proceeds to step S5008. In step S5008, the service engineer executes the operation for changing the service setting value and the user setting value for the image processing apparatus 1005 via the operation unit 2505 and the display unit 2506. In step S5009, the information processing apparatus 1002 issues a key event corresponding to the operation for changing the setting value by the service engineer via the network.

The remote control agent of the image processing apparatus 1005 acquires the key event issued from the information processing apparatus 1002 via the network and interprets the received key event. In step S5010, the remote control agent issues an event for displaying a dialog screen to the application to prompt the operator to determine whether to change the setting value. The remote control agent of the image processing apparatus 1005 does not execute the processing for changing the setting value immediately after receiving the key event issued from the information processing apparatus 1002. The above-described setting values may include, for example, at least one of the reading density, the amount of applied toner, and the tint adjustment value.

The application shifts the screen currently displayed on the display unit 3001 of the operation unit 2006 to a remote control execution screen (e.g., service setting change inquiry screen) 5100. The remote control execution screen 5100 displays a message such as for example "Permit changing the service setting?". When the operator has selected and pressed an OK button or a NO button on the remote control execution screen 5100, the processing proceeds to step S5011. In step S5011, the remote control agent transmits a response from the image processing apparatus 1005 to the information processing apparatus 1002 via the network.

If the operator has pressed the NO button on the remote control execution screen 5100, then the service engineer can recognize that the operator refuses to permit the change of the setting value. In this case, in step S5020, on the information processing apparatus 1002, a local support for executing the maintenance by the service engineer at the installation location of the image processing apparatus 1005 may be arranged.

On the other hand, if the operator has pressed the OK button on the remote control execution screen 5100, then a request for continuing the remote maintenance is transmitted to the service engineer. In this case, in step S5012, on the information processing apparatus 1002, the service engineer executes the operation for changing each setting value via the operation unit 2505 and the display unit 2506 and continues the remote maintenance of the image processing apparatus 1005. In step S5013, the information processing apparatus 1002 issues a key event corresponding to the operation for changing the setting value by the service engineer via the network.

The image processing apparatus 1005 receives the key event issued from the information processing apparatus 1002 in steps S5009 and S5013. Furthermore, the image processing apparatus 1005 may store each setting value to be changed in a temporary storage area of the RAM 2002 of the image processing apparatus 1005.

In step S5014, on the information processing apparatus 1002, if no setting to be changed remains, then the service engineer executes an operation for ending the setting value changing operation. In this case, in step S5015, the information processing apparatus 1002 issues a key event indicating that the remote maintenance has been completed via the network.

The remote control agent of the image processing apparatus 1005 acquires and interprets the key event (e.g., the remote maintenance completion notification) issued from the information processing apparatus 1002 via the network. In step S5016, the remote control agent refers to the interactive determination table (e.g., refer to FIG. 8) according to the type of each setting value that has been changed and stored in the above-described temporary storage area and determines whether any item that can be verified by the operator exists. Furthermore, in step S5017, the remote control agent determines whether the change of the setting executed from the information processing apparatus 1002 can be verified by the operator.

If it is determined in step S5017 that the change of the setting executed from the information processing apparatus 1002 cannot be verified by the operator, then the remote control agent writes the setting value in a non-volatile area (e.g., the ROM 2003) of the image processing apparatus 1005. The remote control agent does not execute the inquiry to the operator via the screen on the display unit 3001 of the operation unit 2006. In step S5019, the remote control agent transmits the notification of the final result (information indicating "OK") to the information processing apparatus 1002 via the network.

On the other hand, if it is determined, in step S5017, that the change of the setting executed from the information processing apparatus 1002 can be verified by the operator, then the remote control agent notifies of this accordingly. In this case, the application shifts the screen currently displayed on the display unit 3001 of the operation unit 2006 to a remote control execution screen 5200. The remote control execution screen 5200 displays a message such as for example, "The tint has been changed. Execute test printing?". The remote control execution screen 5200 prompts the operator to determine whether to verify the changed setting (i.e., the tint in this case) by actually operating the image processing apparatus 1005 (i.e., by actually executing test printing on the image processing apparatus 1005) according to the changed setting.

If the operator has selected not to execute test printing (i.e., an operation test) via the remote control execution screen 5200, then the processing proceeds to step S5018. In step S5018, the remote control agent writes the setting value in the non-volatile area of the image processing apparatus 1005, then the processing proceeds to step S5019. In step S5019, the remote control agent transmits the notification of the final result (e.g., information indicating "OK") to the information processing apparatus 1002 via the network.

On the other hand, if the operator has selected to execute test printing (i.e., an operation test) via the remote control execution screen 5200, then the remote control agent executes the following processing. That is, in this case, the remote control agent refers to an interactive determination table (e.g., FIG. 8A), which will be described in detail later below, and causes the application not to display information on the display unit 3001 of the operation unit 2006. Furthermore, the remote control agent discontinues the inhibition against the input of information from the network and the public line, and the key input from the operation unit 2006. In addition, the remote control agent executes the test print job selected by the operator with the printer unit 2017.

When the operator has issued a test printing completion notification via the operation unit 2006, the application may shift the screen on the display unit 3001 of the operation unit 2006 to a print result inquiry screen for inquiring the result of the test printing. The processing will be described in detail later below.

If the operator has selected "OK" according to a result of the test printing via the print result inquiry screen, the remote control agent writes the setting value in the non-volatile area of the image processing apparatus 1005, then the processing advances to step S5019. In step S5019, the remote control agent transmits the notification of the final result (information indicating "OK") to the information processing apparatus 1002 via the network.

On the other hand, if the operator has selected "NO" via the print result inquiry screen according to the result of the test printing, then the remote control agent deletes the setting value from the temporary storage area of the image processing apparatus 1005, then the processing proceeds to step S5019. In step S5019, the remote control agent transmits the notification of the final result (information indicating "NO") to the information processing apparatus 1002 via the network.

When the information processing apparatus 1002 has received the final result notification from the image processing apparatus 1005 via the network, the remote maintenance ends.

Now, an example of processing for the remote maintenance executed by the image processing apparatus 1005 of the remote control system will be described in detail below with reference to FIGS. 6A through 9B.

Figure 6A:
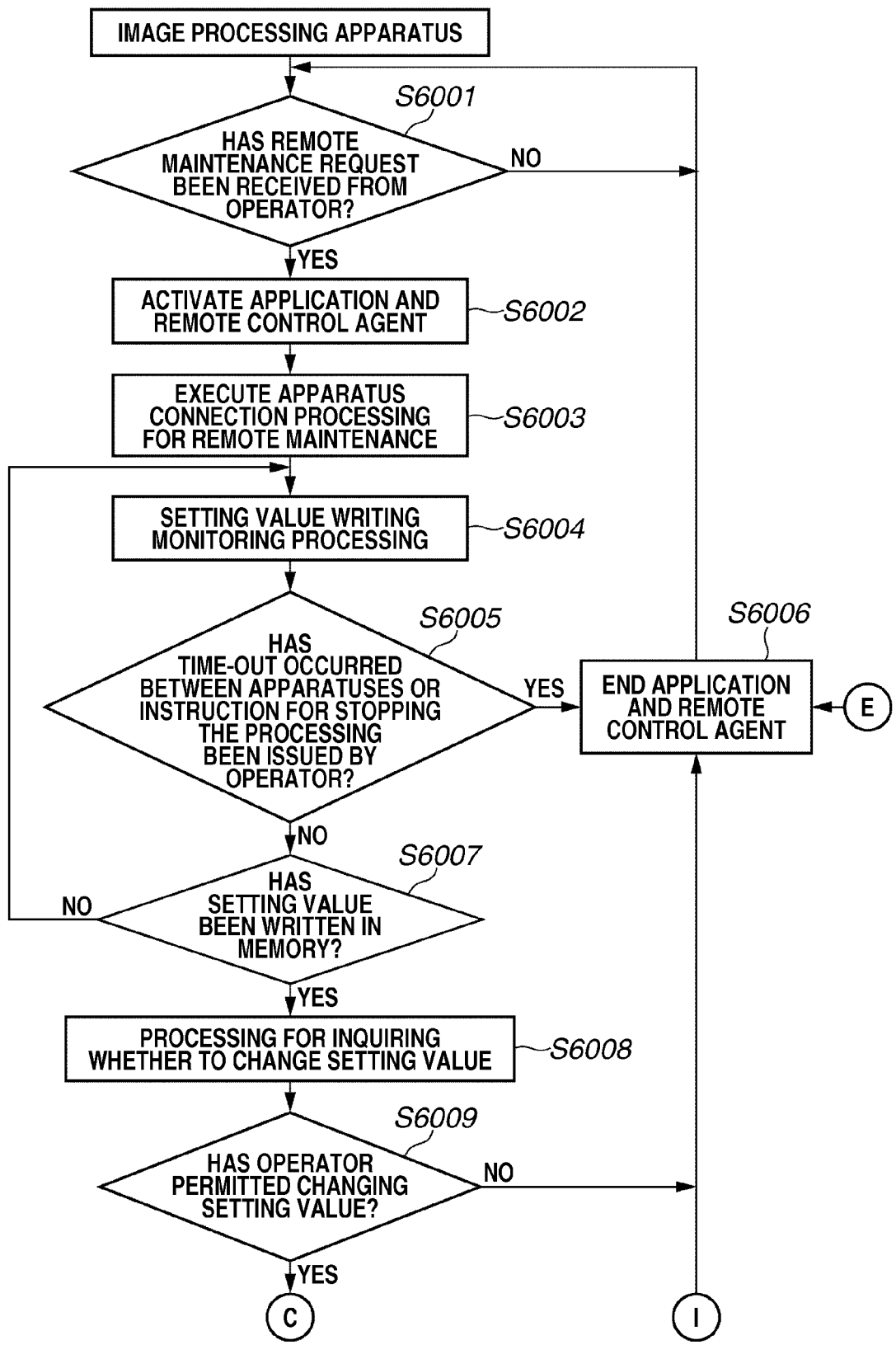
FIG. 6A is a flow chart illustrating exemplary processing for a remote maintenance executed by the image processing apparatus according to an exemplary embodiment of the present invention.
Figure 6B:
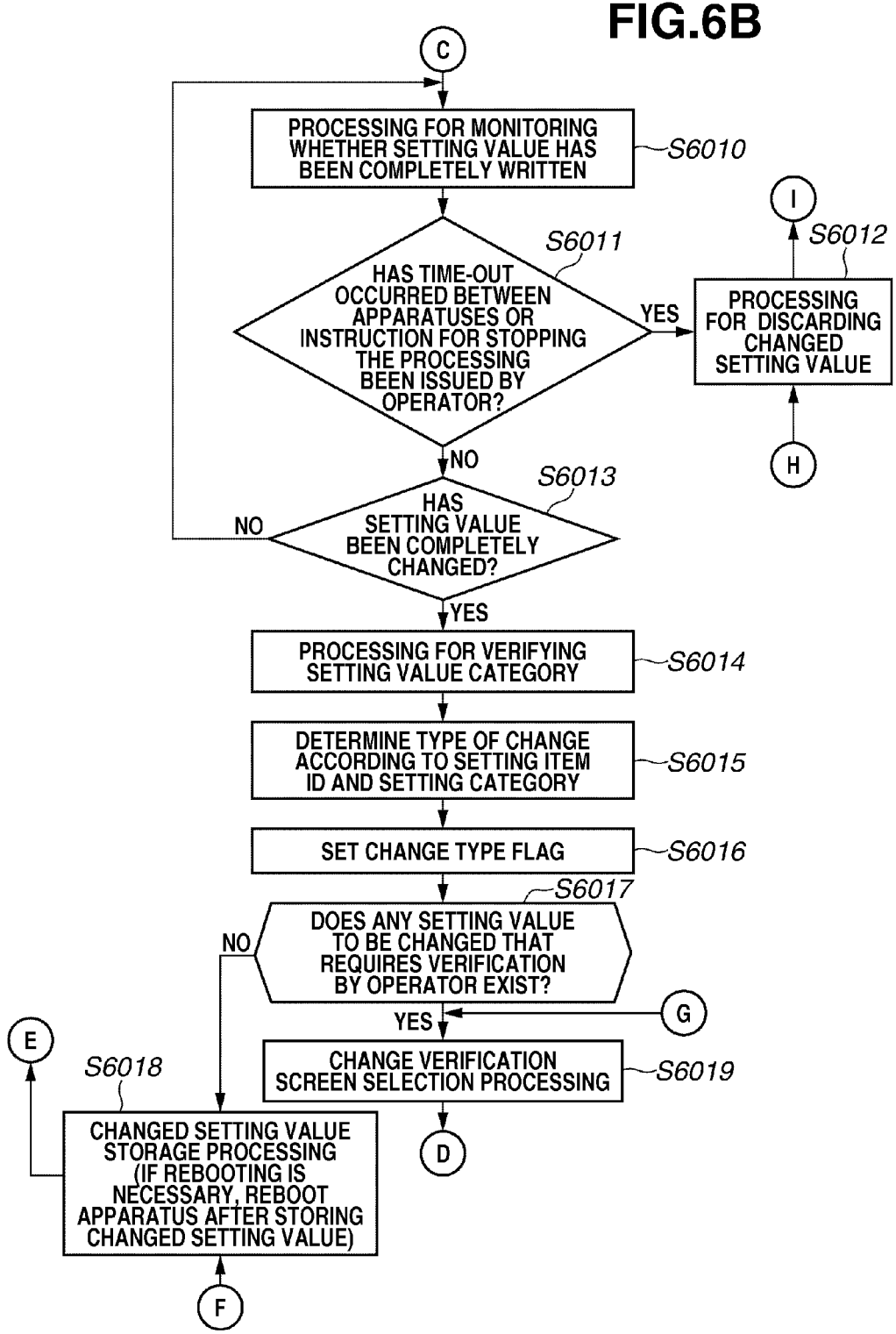
FIG. 6B is a flow chart illustrating exemplary processing for a remote maintenance executed by the image processing apparatus according to an exemplary embodiment of the present invention.
Figure 7A:
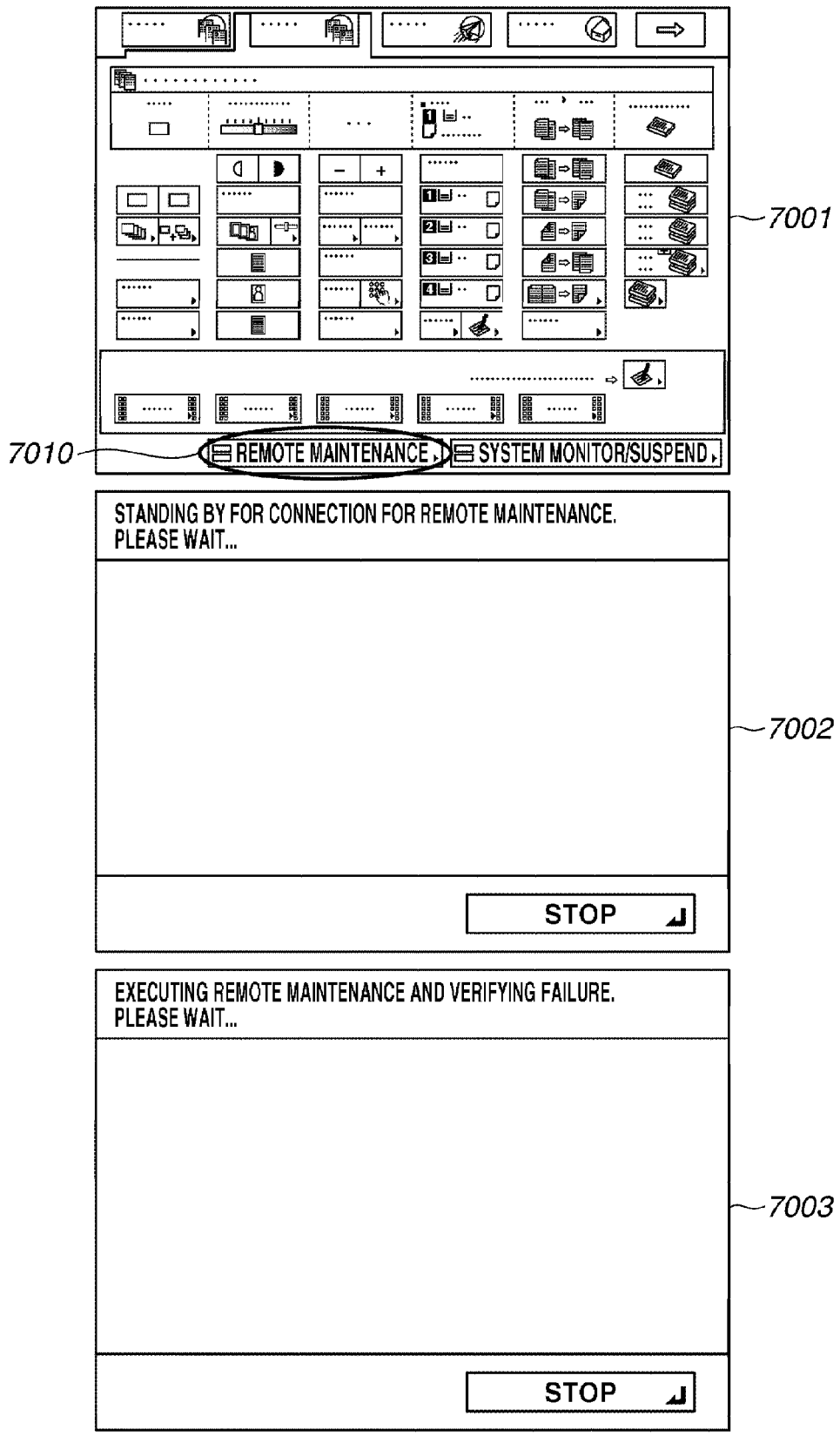
FIG. 7A illustrates an example of various screens displayed on the operation unit of the image processing apparatus according to an exemplary embodiment of the present invention.
Figure 9B:
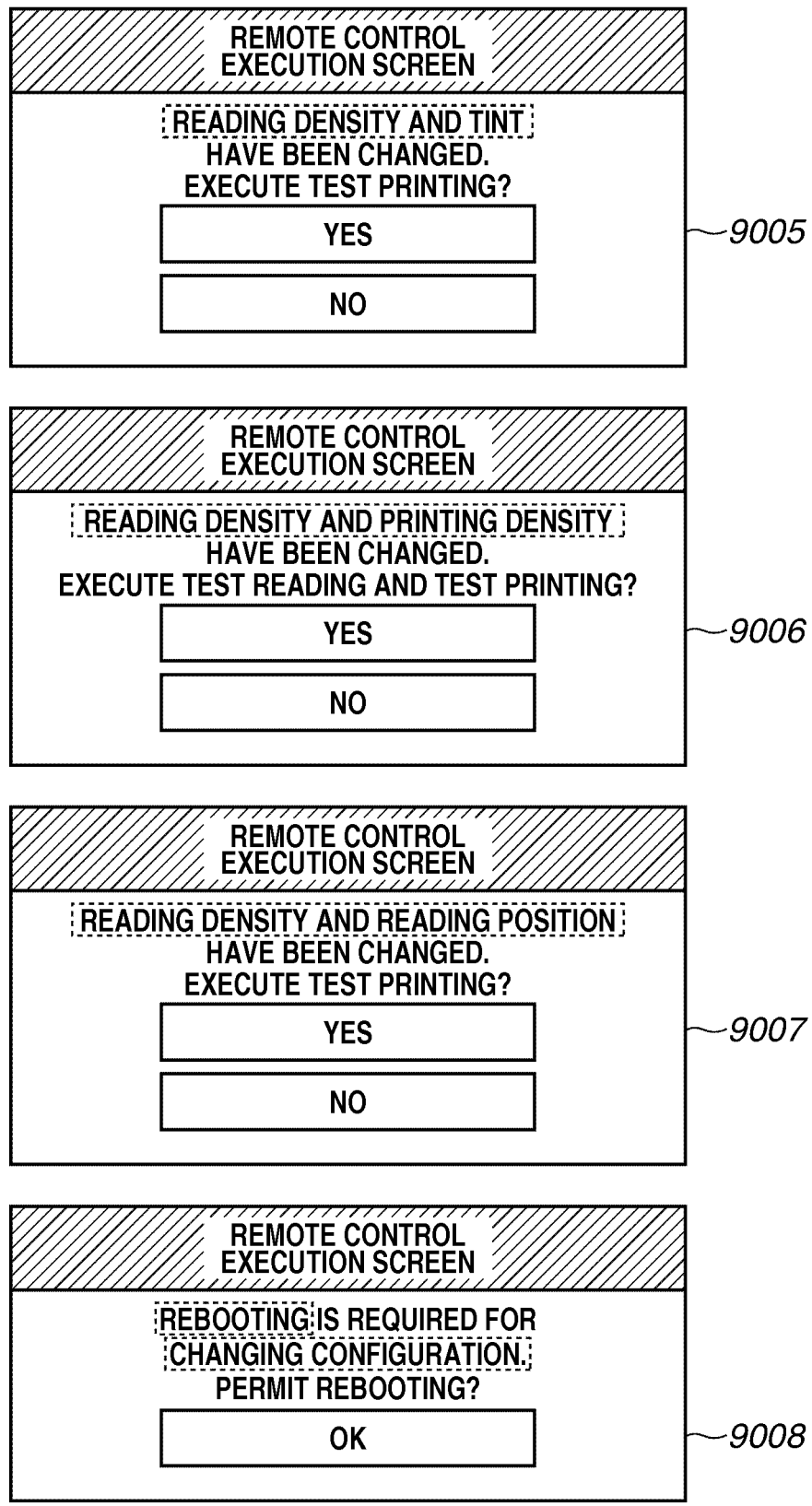
FIG. 9B illustrates an example of various screens displayed on the operation unit of the image processing apparatus according to an exemplary embodiment of the present invention.

Each of FIGS. 6A, 6B, and 6C is a flow chart illustrating an example of processing for the remote maintenance executed by the image processing apparatus 1005. FIGS. 7A and 7B each illustrate an example of various screens displayed on the operation unit 2006 of the image processing apparatus 1005. FIG. 8A illustrates an example of an interactive determination table of the image processing apparatus. FIG. 8B illustrates an example of change type flags each indicating the type of the adjustment to be changed. FIGS. 9A and 9B each illustrate an example of various screens displayed on the operation unit of the image processing apparatus.

Referring to FIGS. 6A through 6C, in step S6001, the CPU 2001 of the image processing apparatus 1005 monitors whether the operator has activated the application by pressing a remote maintenance button 7010 on a standby screen 7001 (e.g., FIG. 7A) displayed on the display unit 3001 of the operation unit 2006. If it is determined in step S6001 that the operator has activated the application by pressing a remote maintenance button 7010 (i.e., if the operator has issued a remote maintenance request) (YES in step S6001), then the processing proceeds to step S6002. In step S6002, the CPU 2001 activates the application and the remote control agent. In this case, a screen 7002 (e.g., FIG. 7A) is displayed on the display unit 3001. If it is determined in step S6001 that the operator has not issued a remote maintenance request (NO in step S6001), then the step S6001 may be repeated until the request is issued.

In step S6003, the remote control agent executes processing for connecting the image processing apparatus 1005 with the information processing apparatus 1002 for remote maintenance. On the screen 7002, a connection waiting state may be displayed. Then, the remote control agent receives a response from the information processing apparatus 1002 indicating that the information processing apparatus 1002 has been in connection with the image processing apparatus 1005. Then, the remote control agent transmits information about the image processing apparatus 1005 (e.g., the device unique ID) to the information processing apparatus 1002, thereafter the processing proceeds to step S6004. A screen 7003 may be displayed on the display unit 3001 (e.g., FIG. 7A). The screen 7003 illustrates that the image processing apparatus 1005 is being remotely operated for maintenance from the information processing apparatus 1002 to identify the location of the failure.

In step S6004, the remote control agent executes processing for monitoring the writing of the setting value in the memory of the image processing apparatus 1005. In addition to executing the monitoring processing in step S6004, the remote control agent, in step S6005, determines whether a timeout has occurred in the connection between the image processing apparatus 1005 and the information processing apparatus 1002, or whether the operator has instructed suspending the processing. If it is determined in step S6005 that a timeout has occurred in the connection between the image processing apparatus 1005 and the information processing apparatus 1002, or that the operator has instructed suspending the processing (YES in step S6005), then the processing proceeds to step S6006. In step S6006, the processing by the application and the remote control agent ends. At the same time, the display screen on the display unit 3001 returns to the initial screen (e.g., the standby screen 7001).

On the other hand, if it is determined in step S6005 that timeout has not occurred in the connection between the image processing apparatus 1005 and the information processing apparatus 1002, and that the operator has not instructed suspending the processing (NO in step S6005), then the processing proceeds to step S6007. In step S6007, the remote control agent determines whether the setting value has been written to the memory of the image processing apparatus 1005 (i.e., whether the change of the setting value has been detected). If it is determined in step S6007 that the change of the setting value has been detected (YES in step S6007), then the processing proceeds to step S6008. On the other hand, if it is determined in step S6007 that the change of the setting value has not been detected (NO in step S6007), then the processing returns to step S6004 and the remote control agent repeats the above-described processing until any of the occurrence of a timeout, a processing suspending instruction, and the change of the setting value has been detected. Here, the "detection of the change of the setting value" refers to receiving and interpreting the change in the service setting value and the user setting value, which are transmitted from the information processing apparatus 1002, for the image processing apparatus 1005.

If the change of the setting value has been detected in step S6007, the remote control agent, in step S6008, notifies the application that the setting value has been changed. After receiving the notification, the application shifts the screen on the display unit 3001 to a screen for prompting the operator to determine whether to permit the change of the setting value. In this case, a screen 7004 (e.g., FIG. 7B) may be displayed on the display unit 3001. On the screen 7004, a message for prompting the operator to determine whether to permit the change of the setting value is displayed.

If the operator has issued an instruction for permitting the change of the setting value (e.g., pressed the OK button) (YES in step S6009), then the processing proceeds to step S6010. On the other hand, if the operator has issued an instruction for inhibiting the change of the setting value (pressed the NO button) (NO in step S6009), then the processing proceeds to step S6006. In step S6006, the processing by the application and the remote control agent ends. The display screen on the display unit 3001 returns to the initial screen (e.g., the standby screen 7001).

If the operator has permitted the change of the setting value, then the remote control agent, in step S6010, executes processing for monitoring whether the writing of the setting value on the memory of the image processing apparatus 1005 has been completed. In step S6011, the remote control agent determines whether a timeout has occurred in the connection between the image processing apparatus 1005 and the information processing apparatus 1002, or whether the operator has instructed suspending the processing.

If it is determined in steps S6010 and S6011 that the operator has inhibited the change of the setting value, a timeout has occurred, or the operator has instructed the suspension of the processing (YES in step S6011), then the processing proceeds to step S6012. In step S6012, the remote control agent discards the changed setting value that has been temporarily stored in the memory of the image processing apparatus 1005 (e.g., the RAM 2002), then the processing proceeds to step S6006. In step S6006, the processing by the application and the remote control agent ends. The display screen on the display unit 3001 returns to the initial screen (e.g., the standby screen 7001).

On the other hand, if the operator has permitted the change of the setting value and timeout has not occurred, and the operator has not instructed the suspension of the processing (NO in step S6011), then the processing proceeds to step S6013. In step S6013, the remote control agent waits until a setting value change completion notification is received from the information processing apparatus 1002. In this case, a screen 7005 (e.g., FIG. 7B) may be displayed on the display unit 3001. On the screen 7005, a message indicating that the setting value is being changed is displayed. After receiving the setting value change completion notification from the information processing apparatus 1002 (YES in step S6013), the remote control agent proceeds to step S6014. If the setting value change completion notification is not received (NO in step S6013), processing returns to step S6010.

In step S6014, the remote control agent executes processing for verifying a setting category to which the changed setting value that has been temporarily stored in the memory of the image processing apparatus 1005 belongs by referring to an interactive determination table 8001 (e.g., FIG. 8A). In step S6015, the remote control agent determines the type of the change of the setting based on a setting item ID and the setting category by referring to the interactive determination table 8001. If the setting category is "LAMP" (the luminous intensity) and the setting item ID is "L-DATAFL_OFST" in the interactive determination table 8001, the reading density is determined as the change type.

The setting category can include one or more of the reading density, the reading start position, reading luminous intensity adjustment, laser adjustment, the writing start position, the amount of applied toner, the image blank portion width, a contrast potential, tint adjustment, cassette adjustment, the network setting, the sleep setting, and the luminous intensity. The change type can include one or more of the reading position, the printing density, the printing position, the tint, the configuration, and the reading density. The "configuration" may include a threshold value used for detecting, for example, the quantity of the remaining sheets set in the paper feed cassette of the image processing apparatus, upper and lower limit values of the sheet stacking quantity (e.g., cassette adjustment), and the setting of the network address of the image processing apparatus (e.g., the network setting).

In step S6016, the remote control agent sets a change type flag 8002 (e.g., FIG. 8B). In step S6017, the remote control agent determines whether any change of setting value that requires the verification and permission by the operator, among the setting values for the image processing apparatus 1005, exists. More specifically, the remote control agent determines the category of the plurality of setting values that have been changed and temporarily stored in the memory of the image processing apparatus 1005 in steps S6015 through S6017 according to the interactive determination table 8001 (e.g., FIG. 8A). The interactive determination table 8001 (e.g., FIG. 8A) and the change type flag 8002 (e.g., FIG. 8B) will be described in detail later below.

If it is determined in step S6017 that no change of setting value that requires the verification and permission by the operator, among the setting values for the image processing apparatus 1005, exists (NO in step S6017), then the processing proceeds to step S6018. Instep S6018, the remote control agent stores the changed setting value normally that has been temporarily stored in the memory of the image processing apparatus 1005, then the processing proceeds to step S6006, where the application and remote control agent are ended. If it is necessary to reboot the image processing apparatus 1005, the remote control agent may reboot the image processing apparatus 1005 after storing the changed setting value.

On the other hand, if it is determined in step S6017 that a change of setting value that requires the verification and permission by the operator, among the setting values for the image processing apparatus 1005, exists (YES in step S6017), then the processing proceeds to step S6019. In step S6019, the application displays a verification screen on the display unit 3001 according to the value of each item corresponding to the change type flag 8002 (e.g., FIG. 8B) and the interactive determination table 8001 (e.g., FIG. 8A). A verification that requires rebooting of the image processing apparatus 1005 may be executed at the last stage of the processing. Accordingly, in step S6020, the application determines whether only the item "configuration" among the items of the change type flags 8002 (FIG. 8B) is set ("1").

If it is determined in step S6020 that only the item "configuration" among the items of the change type flags 8002 (FIG. 8B) is set ("1") (YES in step S6020), then the application displays a verification screen 9001 (e.g., FIG. 9A), and processing proceeds to step S6026. In this case, a message such as for example, "Device configuration will be changed. Permit rebooting?", may be displayed. On the other hand, if an item among the items of the change type flags 8002 (e.g., FIG. 8B) other than the item "configuration" is set ("1") (i.e., if the verification requiring an operation on an image has been set) (NO in step S6020), then the application may display a verification screen 9002 (e.g., FIG. 9A). In this case, a message such as, for example, "XXX has been changed. Verify YYY?", may be displayed. On the verification screen 9002, the change type to which the changed setting belongs and at least one verification item are displayed.

When the verification screen 9002 is displayed, the application, in step S6021, determines whether the operator has issued a request for verifying the operation by selecting a button "verify operation" (YES button). If the operator has issued the request for verifying the operation (YES in step S6021), then the processing proceeds to step S6022. In step S6022, the application resumes receiving of an operation input from the operation unit 2006 and so that a normal job can be executed on the image processing apparatus 1005 and resumes the execution of the job. In this case, the application executes the normal operation until the operation verification by the operator ends. In this case, the screen on the display unit 3001 shifts to a screen 9003. On the other hand, if the operator has not issued an operation verification request (NO in step S6021), then the processing proceeds to step S6025.

In step S6023, the application determines whether the operator has completely verified the actual operation of the image processing apparatus 1005 and instructed the end of the operation verification. If it is determined in step S6023 that the operator has instructed ending the operation verification (YES in step S6023), then the processing proceeds to step S6024. If it is determined in step S6023 that the operator has not instructed ending the operation verification NO in step S6023), then processing returns to step S6022. In step S6024, the application disables (set to "0") the item of the change type flag 8002 corresponding to the item for which the operator has verified the operation of the image processing apparatus 1005 (one or more of the reading density, the reading position, the printing position, the printing density, the tint, and the configuration). Processing then returns to step S6019

If the operator has not requested the operation verification in step S6021 (NO in step S6021), then the application determines that the operator has selected "OK" and proceeds to step S6025. In step S6025, the application determines whether all the items of the change type flag 8002 have been disabled (set to "0"). If it is determined in step S6025 that the application determines all the items of the change type flag 8002 have been disabled (set to "0") (YES in step S6025), then the processing proceeds to step S6026. On the other hand, if it is determined in step S6025 that any item whose flag has been set (set to "1") among the items of the change type flag 8002 exists (NO in step S6025), then the processing returns to step S6019. In step S6019, the application displays other verification item on the display unit 3001.

If only the item "configuration" among the items of the change type flags 8002 is set (set to "1") in step S6020 (YES in step S6020) or if all the items of the change type flag 8002 have been disabled (set to "0") in step S6025 (YES in step S6025), then the application executes the following processing in step S6026. That is, the application displays a final verification screen 9004 (e.g., FIG. 9A) on the display unit 3001. In this case, a message such as for example "Is result of verifying operation normal?", may be displayed. The operator executes an operation for the final verification via the final verification screen 9004 (e.g., presses the YES button or the NO button).

The application receives the final verification result issued by the operator through operating the final verification screen 9004 and notifies the final verification result to the remote control agent. In this case, the remote control agent, in step S6027, transmits the result of the final verification to the information processing apparatus 1002 via the network. Thus, the end of the remote maintenance is notified. In step S6028, the application determines whether the result of the operator's final verification is "OK". If it is determined in step S6028 that the result of the operator's final verification is "OK" (YES in step S6028), then the processing proceeds to step S6018. In step S6018, the application changes the setting value. Then, the processing ends. On the other hand, if it is determined in step S6028 that the result of the operator's final verification is "NO" (NO in step S6028), then the application discards the setting value. Then, the processing ends.

After the operator has verified each changed setting of the image processing apparatus 1005 (the "tint", for example) and if only the item "configuration" among the items of the change type flag 8002 has been set ("1") in step S6020 (i.e., if the verification requiring rebooting has been requested) (YES in step S6020), then the processing proceeds to step S6026. In step S6026, the application displays the verification screen 9001 on the display unit 3001, and in step S6027, the result of the final verification is transmitted to the information processing apparatus 1002. If the operator has selected "OK" (i.e., reboot the image processing apparatus 1005) (YES in step S6028) via the verification screen 9001, then the processing proceeds from step S6027 through step S6028 to step S6018. In step S6018, the application stores the setting value on the memory of the image processing apparatus 1005, and then reboots the image processing apparatus 1005.

Now, the interactive determination table 8001 (e.g., FIG. 8A) and the change type flag 8002 (e.g., FIG. 8B) will be described in detail below.

The example of the interactive determination table 8001 stores the relationship between the setting category to which the setting item ID of the change target setting value belongs, the outline of the change type of the setting to be changed, and the verification item to be verified by the operator. The setting category includes, for example, "LAMP" (luminous intensity), "AE" (reading density), "ADJ-XY" (reading start position), "CCD" (reading luminous intensity adjustment), "LASER" (laser adjustment), "IMG-REG" (writing start position), "DENS" (amount of applied toner), "BLANK" (image blank portion width), "CONT" (contrast potential), "COLOR" (tint adjustment), "CST-ADJ" (cassette setting adjustment), "NETWORK" (network setting), and "SLEEP" (sleep setting).

The change type flag 8002 is a flag indicating which item (e.g., the reading density, the reading position, the printing position, the printing density, the tint, and the configuration) has been changed according to the change type. The parameter "0" is set to only the item that has never been changed when a plurality of setting values has been changed, among the items of the change type flag 8002.

In step S6017, the application determines that the parameter "1" is set for at least one item of those of the change type flag 8002 (YES in step S6017). In step S6019, the application executes the inquiry to the operator via the verification screen. The application refers to the interactive determination table 8001 and displays on the display unit 3001 the setting value change type and the setting value change item of the component for which the parameter "1" is set as the change type flag 8002.

In this regard, if the change type flag 8002 has the following parameter values, namely, the reading density="0", the reading position="0", the printing position="0", the printing density="1", the tint="1", and the configuration="0", for example, then only the setting related to print processing may be verified. Accordingly, the operator verifies the setting value related to print processing on a remote control execution screen 9005 (e.g., FIG. 9B).

If the change type flag 8002 has the following parameter values, namely, the reading density="1", the reading position="1", the printing position="0", the printing density="0", the tint="0", and the configuration="0", for example, then only the setting related to reading processing may be verified. Accordingly, the operator verifies the setting value related to reading processing on a remote control execution screen 9007 (e.g., FIG. 9B).

If the change type flag 8002 has the following parameter values, namely, the reading density="1", the reading position="0", the printing position="0", the printing density="1", the tint="0", and the configuration="0", for example, then the operator verifies the setting for reading and printing on a remote control execution screen 9006 (e.g., FIG. 9B).

On the other hand, if the change type flag 8002 has the parameter value "1" for the configuration, then after the verification has been completed for all items, the operator may determine whether to reboot the image processing apparatus 1005 on a remote control execution screen 9008 (e.g., FIG. 9B) in step S6024.

However, if the change type flag 8002 has the parameter values, such as the reading density="0", the reading position="0", the printing position="0", the printing density="0", the tint="0", and the configuration="1", for example, then the operator, in step S6020, may determine whether to execute test printing on the image processing apparatus 1005.

Now, the setting category in the example of the interactive determination table 8001 (e.g., FIG. 8A) will be described in more detail below. The item "CST-ADJ (cassette adjustment)" includes the threshold value used for detecting the quantity of the remaining sheets stacked in the paper feed cassette and upper and lower limit values of the quantity of the sheet stacked in the paper feed cassette. The item "CST-ADJ (cassette adjustment)" requires rebooting of the image processing apparatus 1005 to update the value thereof to meet the value displayed on the screen of the display unit 3001.

The item "NETWORK (network setting)" includes the setting for the timeout for continuing the connection of the image processing apparatus 1005 to the network, a switch for switching the connection with the information processing apparatus 1002, and the setting for the network address of the information processing apparatus 1002. The item "NETWORK (network setting)" requires rebooting of the image processing apparatus 1005 to apply the network setting thereto.

Note here that each of the remote control execution screens 9005 through 9008 (e.g., FIG. 9B) may represent a simplified example. That is, the remote control execution screens 9001 and 9008 indicate the same screen. In addition, a portion surrounded by a broken line rectangle in the remote control execution screen is a text string indicating the change type and the verification item in the interactive determination table 8001.

With the above-described configuration, the present exemplary embodiment may have the following effects. When receiving a remote control request from the image processing apparatus 1005, the information processing apparatus 1002 can transmit remote control information for changing the setting value of the image processing apparatus 1005 thereto via the network. After receiving the remote control information from the information processing apparatus 1002 via the network, the image processing apparatus 1005 may detect the change of the setting value based on the received remote control information. Furthermore, the image processing apparatus 1005 can determine whether to display on the display unit 3001 a screen for prompting the operator to determine whether to permit the change of the setting value according to the content of the detected change of the setting value.

With the above-described configuration, when the setting value for the image processing apparatus has been changed from the information processing apparatus via the network, the present exemplary embodiment can store and apply the setting value for the image processing apparatus after the user has interactively and visually verified the effect to be obtained by using the changed setting via the display screen. Accordingly, aspects of the present exemplary embodiment can improve the serviceability of the image processing apparatus. Thus, the trouble associated with executing a maintenance operation on the image processing apparatus on the part of the user and the service engineer, can be significantly reduced. Aspects of the exemplary embodiment may be directed to one or more of a remote control system, an image processing apparatus, a method for controlling the image processing apparatus, and a program. They may be capable of improving the serviceability, and reducing the trouble on a user and/or and a service engineer in executing a maintenance operation.

Furthermore, as described above, the aspects of the present exemplary embodiment allow for displaying messages for serially prompting the operator to determine whether to execute an operation for each of the same type of operations among the operations to change a plurality of setting values detected based on a plurality of pieces of remote control information. Accordingly, aspects of the present exemplary embodiment can prevent inquiring of the operator for each of a plurality of setting values to be changed.

Furthermore, if the operator has permitted the change of the setting value, the present exemplary embodiment may apply the changed setting on the image processing apparatus.

On the other hand, if the operator has inhibited the change of the setting value, the present exemplary embodiment may not apply the changed setting value. Accordingly, aspects of the present exemplary embodiment can prevent applying the change of the setting value when not desired by the user.

Furthermore, aspects of the present exemplary embodiment may inquire of the user whether to permit the change of the setting value for the setting related to image forming, such as the reading density, the tint, the amount of applied toner, and the printing position. On the other hand, aspects of the present exemplary embodiment may not inquire of the user whether to permit the change of the setting value for a setting that is not related to image forming. Accordingly, aspects of the present exemplary embodiment can improve the usability.

In addition, with respect to the change of a setting value related to the configuration of the image processing apparatus, such as for example the paper feed cassette sheet stacking quantity and the network address thereof, aspects according to the present exemplary embodiment allow for the display of a message for prompting the user to determine whether to reboot the image processing apparatus after applying the setting value. Accordingly, aspects of the present exemplary embodiment can reduce or prevent annoyance to the user that could otherwise be caused by suddenly rebooting the image processing apparatus.

Moreover, when a remote control request has been transmitted, aspects of the present exemplary embodiment may control the suspension of a job that is currently being processed on the image processing apparatus or the receiving of the input of an operation. Accordingly, aspects of the present exemplary embodiment can prevent interruption by other processes while changing the setting value by remote control.

In the above-described exemplary embodiment of the present invention, the remote control system has the configuration illustrated in FIG. 1. However, the present exemplary embodiment is not limited to this. That is, the type (e.g., a MFP or a printer) and the number of the image processing apparatuses and the information processing apparatuses constituting the remote control system can be appropriately determined.

Aspects according to the present invention can also be achieved by providing a system or an apparatus with a storage medium storing at least one of program code and computer-executable instructions of software that implements functions according to embodiments of the invention. For example, aspects of the invention may be achieved by reading and executing the program code and/or computer-executable instructions stored in the storage medium with, for example, a computer of the system or the apparatus (e.g., a CPU or a micro processing unit (MPU)).

In this case, the program code itself and/or computer-executable instructions, which may be read from the storage medium, may implement functions according to the embodiments described above, and accordingly, the storage medium storing the program code and/or computer-executable instructions may constitute an aspect according to the present invention.

As the storage medium for supplying such program code and/or computer-executable instructions, at least one of a flexible disk, a hard disk, an optical disk, a magneto-optical disk, a magnetooptic disk (MO), a compact disc read only memory (CD-ROM), a compact disc recordable (CD-R), a compact disc rewritable (CD-RW), a magnetic tape, a non-volatile memory card, a read only memory (ROM), and a digital versatile disc (DVD (DVD-recordable (DVD-R), DVD-rewritable (DVD-RW))), for example, can be used. In addition, the program code can be downloaded via a network.

In addition, functions according to the embodiments described above can be implemented not only by executing the program code and/or computer-executable instructions read by the computer, but may also be implemented by processing in which, for example, an operating system (OS) or the like, carries out a part of or the whole of the actual processing based on an instruction given by the program code and/or computer-executable instructions.

Furthermore, the program code and/or computer-executable instructions read from the storage medium may be written in a memory provided in a function expansion board inserted in the computer, or in a function expansion unit connected to the computer, and a CPU and the like provided in the function expansion board or the function expansion unit may carry out a part of or the whole of the processing to implement functions according to aspects of the embodiments as described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-069967 filed Mar. 18, 2008, which is hereby incorporated by reference herein in its entirety.

What is claimed is:

1. A remote control system configured to remotely control an image processing apparatus from an information processing apparatus via a network,
wherein the information processing apparatus comprises:
a transmission unit configured to transmit remote control information for changing a setting value for the image processing apparatus, which is a target of remote control, via the network, and
wherein the image processing apparatus comprises:
a reception unit configured to receive the remote control information from the information processing apparatus via the network;
a determination unit configured to determine a content of the setting value to be changed based on the remote control information received by the reception unit; and
a first display control unit configured to display a screen for making an inquiry to an operator about whether to permit changing of the setting value,
wherein the first display control unit switches whether to display the screen for making the inquiry to the operator about whether to permit changing of the setting value according to the content of the setting value to be changed determined by the determination unit,
wherein the first display control unit displays the screen for making the inquiry to the operator, in a case where the setting value to be changed is related to an image forming process, and the first display control unit does not display the screen for making the inquiry to the operator, in a case where the setting value to be changed is not related to the image forming process, and
wherein the setting value to be changed that is related to the image forming process is at least one of a reading density for reading a document, a tint of an image to be printed, an amount of a developer to be applied when printing, and a print position on a sheet.

2. An image processing apparatus capable of being remotely controlled by an information processing apparatus via a network, the image processing apparatus comprising:
a reception unit configured to receive remote control information for changing a setting value for the image processing apparatus from the information processing apparatus via the network;
a determination unit configured to determine a content of the setting value to be changed based on the remote control information received by the reception unit; and
a first display control unit configured to display a screen for making an inquiry to an operator about whether to permit changing of the setting value,
wherein the first display control unit switches whether to display the screen for making the inquiry to the operator about whether to permit changing of the setting value according to the content of the setting value to be changed determined by the determination unit,
wherein the first display control unit displays the screen for making the inquiry to the operator, in a case where the setting value to be changed is related to an image forming process, and the first display control unit does not display the screen for making the inquiry to the operator, in a case where the setting value to be changed is not related to the image forming process, and
wherein the setting to be changed that is related to the image forming process is at least one of a reading density for reading a document, a tint of an image to be printed, an amount of a developer to be applied when printing, and a print position on a sheet.

3. The image processing apparatus according to claim 2, further comprising:
a reading unit configured to read an image of a document; and
a printing unit configured to print the image on a printing sheet,
wherein the setting value includes at least one of a reading density for reading an image of a document, a tint of an image to be printed, a printing position on a printing sheet, a quantity of sheets set in a paper feed cassette, and a network address of the image processing apparatus.

4. The image processing apparatus according to claim 2, further comprising a second display control unit configured to display a message for prompting the operator to determine whether to reboot the image processing apparatus after applying the changed setting value to the image processing apparatus in a case where the change of the setting value is related to at least one of a configuration of the image processing apparatus including a quantity of sheets stacked in a paper feed cassette and the network address of the image processing apparatus.

5. The image processing apparatus according to claim 2, further comprising an input control unit that is configured to control at least one of suspension of a job, which is currently being processed on the image processing apparatus, and receiving of an input of an operation on the image processing apparatus.

6. The image processing apparatus according to claim 2, further comprising an accepting unit configured to accept from the operator an instruction to shift to a state where a remote control is performable from the information processing apparatus,
wherein the image processing apparatus shifts to the state where a remote control is performable from the information processing apparatus in a case where the accepting unit accepts the instruction.

7. The image processing apparatus according to claim 6, further comprising a transmission unit configured to transmit a request for remote control to the information processing apparatus via the network, in response to accepting of the instruction by the accepting unit,
wherein the reception unit receives the remote control information which is transmitted from the information processing apparatus in response to the request transmitted by the transmission unit.

8. The image processing apparatus according to claim 2, further comprising a third display control unit configured to, in a case where the change of the setting value is permitted by the operator, display a screen for instructing the operator of an operation necessary for changing the setting value or a screen for instructing the operator of processing to be performed in accordance with the change of the setting value, according to the content of the setting value to be changed determined by the determination unit.

9. The image processing apparatus according to claim 8, wherein the operation necessary for changing the setting value is a reboot of the image processing apparatus, and the processing to be performed in accordance with the change of the setting value is a test printing.

10. The image processing apparatus according to claim 8, wherein
the third display control unit displays a screen for instructing to perform a reboot of the image processing apparatus in a case where the setting value to be changed is a sheet stacking amount of paper in a paper cassette or address information of the image processing apparatus in the network, and
the third display control unit displays a screen for instructing to perform a test printing in a case where the setting value to be changed is related to a reading density for reading a document, a tint of an image to be printed, or a print position on a sheet.

11. A method for controlling an image processing apparatus capable of being remotely controlled by an information processing apparatus via a network, the method comprising:
receiving remote control information for changing a setting value for the image processing apparatus from the information processing apparatus via the network,
determining a content of the setting value to be changed based on the received remote control information,
displaying a screen for making an inquiry to an operator about whether to permit changing of the setting value, and
switching whether to display the screen for making the inquiry to the operator about whether to permit changing of the setting value according to the determined content of the setting value to be changed,
wherein the screen is displayed for making the inquiry to the operator, in a case where the setting value to be changed is related to an image forming process, and the screen is not displayed for making the inquiry to the operator, in a case where the setting value to be changed is not related to the image forming process, and
wherein the setting value to be changed that is related to the image forming process is at least one of a reading density for reading a document, a tint of an image to be printed, an amount of a developer to be applied when printing, and a print position on a sheet.

12. A non-transitory computer-readable storage medium having computer-executable instructions stored thereon for causing a computer to perform operations for controlling an image processing apparatus capable of being remotely operated from an information processing apparatus via a network, the computer-readable storage medium comprising:
computer-executable instructions for receiving remote control information for changing a setting value for the image processing apparatus from the information processing apparatus via the network;
computer-executable instructions for determining a content of the setting value to be changed based on the received remote control information,
computer-executable instructions for displaying a screen for making an inquiry to an operator about whether to permit changing of the setting value, and
computer-executable instructions for switching whether to display the screen for making the inquiry to the operator about whether to permit changing of the setting value according to the determined content of the setting value to be changed,
wherein the screen is for making the inquiry to the operator, in a case where the setting value to be changed is related to an image forming process, and the screen is not displayed for making the inquiry to the operator, in a case where the setting value to be changed is not related to the image forming process, and
wherein the setting value to be changed that is related to the image forming process is at least one of a reading density for reading a document, a tint of an image to be printed, an amount of a developer to be applied when printing, and a print position of a sheet.

* * * * *